United States Patent
Su et al.

(10) Patent No.: US 10,917,852 B2
(45) Date of Patent: *Feb. 9, 2021

(54) FRAME TRANSMISSION SCHEME MODIFICATION

(71) Applicant: Apple Inc., Cupertino, CA (US)

(72) Inventors: Li Su, San Jose, CA (US); Jianxiong Shi, Dublin, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,458

(22) Filed: Aug. 14, 2019

(65) Prior Publication Data

US 2019/0373556 A1  Dec. 5, 2019

Related U.S. Application Data

(63) Continuation of application No. 15/878,331, filed on Jan. 23, 2018, now Pat. No. 10,412,679, which is a
(Continued)

(51) Int. Cl.
*H04W 52/02* (2009.01)
*H04L 1/18* (2006.01)
(Continued)

(52) U.S. Cl.
CPC ......... *H04W 52/0261* (2013.01); *H04L 1/189* (2013.01); *H04L 1/1822* (2013.01);
(Continued)

(58) Field of Classification Search
CPC ........... H04W 52/0261; H04W 52/228; H04W 52/24; H04W 52/245; H04W 52/42;
(Continued)

(56) References Cited

U.S. PATENT DOCUMENTS

| 8,539,288 B1 * | 9/2013 | Sun ........................ H04L 1/0048 714/704 |
| 8,578,046 B2 | 11/2013 | Crockett et al. |

(Continued)

FOREIGN PATENT DOCUMENTS

| CN | 1863407 A | 11/2006 |
| CN | 101998327 A * | 3/2011 ............ H04W 28/16 |

(Continued)

OTHER PUBLICATIONS

Weida, Liu; "Research on Lithium Battery Charging Technology of Portable Devices"; Dissertation Submitted to Hangzhou Dianzi University for the Degree of Master; Supervisor: Professor Dong Linxi; Dec. 1, 2013; 12 pages. (Year: 2013).*

(Continued)

*Primary Examiner* — Afsar M Qureshi
(74) *Attorney, Agent, or Firm* — Kowert, Hood, Munyon, Rankin & Goetzel, P.C.

(57) ABSTRACT

In some embodiments, an apparatus is configured to wirelessly communicate with a base station using a first retransmission parameter in a first frame transmission scheme. In some embodiments, the apparatus is configured to determine a current performance metric and, based on the current performance metric, use a second, different retransmission parameter in a second frame transmission scheme for subsequent communications. In some embodiments, the retransmission parameter is a number of retransmissions or a number of hybrid automatic repeat request (HARQ) processes.

20 Claims, 13 Drawing Sheets

Related U.S. Application Data continuation of application No. 15/076,740, filed on Mar. 22, 2016, now Pat. No. 9,894,614.

(60) Provisional application No. 62/141,109, filed on Mar. 31, 2015, provisional application No. 62/158,279, filed on May 7, 2015, provisional application No. 62/172,661, filed on Jun. 8, 2015.

(51) Int. Cl.
*H04W 28/02* (2009.01)
*H04W 52/22* (2009.01)
*H04W 52/24* (2009.01)

(52) U.S. Cl.
CPC ....... *H04L 1/1825* (2013.01); *H04W 28/0221* (2013.01); *H04W 52/228* (2013.01); *H04W 52/24* (2013.01); *H04W 52/245* (2013.01); *Y02D 30/70* (2020.08)

(58) Field of Classification Search
CPC ...... H04W 52/08; H04W 52/241; H04B 7/00; H04B 7/061; H04B 7/022; H04L 1/1822; H04L 1/1825; H04L 1/189; Y02D 30/70
See application file for complete search history.

(56) References Cited

U.S. PATENT DOCUMENTS

| | | | |
|---|---|---|---|
| 8,842,568 B2 | 9/2014 | Awais | |
| 8,982,755 B1* | 3/2015 | Shah | H04L 1/1896 370/311 |
| 9,894,614 B2 | 2/2018 | Su | |
| 10,412,679 B2* | 9/2019 | Su | H04W 28/0221 |
| 2007/0191054 A1* | 8/2007 | Das | H04B 7/022 455/525 |
| 2008/0101398 A1 | 5/2008 | Ojala et al. | |
| 2008/0212345 A1 | 9/2008 | Yamashita | |
| 2010/0165856 A1 | 7/2010 | Melpignano et al. | |
| 2011/0122786 A1 | 5/2011 | Koo et al. | |
| 2013/0308520 A1 | 11/2013 | Damnjanovic | |
| 2014/0105041 A1 | 4/2014 | Swaminathan et al. | |
| 2015/0039958 A1* | 2/2015 | Vos | H04L 1/1864 714/748 |
| 2015/0092575 A1 | 4/2015 | Khay-Ibbat et al. | |
| 2015/0149850 A1 | 5/2015 | Leach et al. | |

FOREIGN PATENT DOCUMENTS

| | | | |
|---|---|---|---|
| CN | 101998327 A | 3/2011 | |
| CN | 102264134 A | 11/2011 | |
| CN | 103297181 A | 9/2013 | |
| EP | 1722522 | 11/2006 | |
| EP | 1722522 A1 * | 11/2006 | ........... H04L 1/0007 |
| EP | 2391045 | 11/2011 | |
| EP | 2391045 A1 * | 11/2011 | ........... H04L 1/1893 |
| WO | 2009132236 | 10/2009 | |
| WO | WO-2014104958 A1 * | 7/2014 | ........ H04W 36/0005 |
| WO | WO2014104958 A1 | 7/2014 | |

OTHER PUBLICATIONS

International search report and written opinion for International patent application No. PCT/US2016/024619, dated Sep. 16, 2016, pp. 1-18 (Year: 2016).*
Office Action, Chinese Application 2016/80012978.7, dated Sep. 21, 2018.*
Invitation to Pay Additional Fees for International Application No. PCT/US2016/024619, dated Jun. 24, 2016, pp. 1-6.
International Search Report and Written Opinion for International Patent Application No. PCT/US2016/024619, dated Sep. 16, 2016, pp. 1-18.
Office Action, Chinese Application for Invention No. 201680012978.7, dated Sep. 21, 2018, seven pages.
Weida, Liu; "Research on Lithium Battery Charging Technology of Portable Devices"; Dissertation Submitted to Hangzhou Dianzi University for the Degree of Master; Supervisor: Professor Dong Linxi; Dec. 1, 2013; 12 pages.
Second Office Action, Chinese Application for Invention No. 201680012978.7, dated Mar. 4, 2019, seven pages.

* cited by examiner

FRAME TRANSMISSION SCHEME MODIFICATION

PRIORITY CLAIM

This application is a continuation of U.S. patent application Ser. No. 15/878,331 filed on Jan. 23, 2018, now U.S. Pat. No. 10,412,679 issued on Sep. 10, 2019, which is a continuation of U.S. patent application Ser. No. 15/076,740 titled "Frame Transmission Scheme Modification" and filed on Mar. 22, 2016, now U.S. Pat. No. 9,894,614 issued on Feb. 13, 2018, which claims the benefit of U.S. Provisional Application No. 62/141,109, filed on Mar. 31, 2015, U.S. Provisional Application No. 62/158,279, filed on May 7, 2015, and U.S. Provisional Application No. 62/172,661, filed on Jun. 8, 2015, all of which are hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including enabling a mobile device to configure frame transmission parameters.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Typically, wearable devices have had limited wireless communications capabilities and were capable of communicating only over wired interfaces or short-range point-to-point technologies. Further, wearable devices typically have smaller batteries than larger portable devices, such as smart phones and tablets.

SUMMARY

Embodiments are presented herein of, inter alia, an accessory device, such as a smart watch, and associated methods for configuring a frame transmission scheme dynamically managing power consumption.

In some embodiments, an accessory device may perform an IP session with a base station. At a first time, communication between the accessory device and the base station may have a first performance metric and the accessory device may implement a first frame transmission scheme. The device may determine a current performance metric. Based on the current performance metric, the accessory device may modify the first frame transmission scheme.

In some embodiments, a mobile device is configured to prevent upcoming scheduled wireless transmission in response to detecting that a voltage corresponding to battery output is below a particular threshold.

In some embodiments, a mobile device is configured to determine that the device is in a talking state and determine that a voltage corresponding to battery output is dropping below a threshold value at greater than a threshold frequency. In response, in these embodiments, the device is configured to perform a power reduction action. The action may include requesting that other components reduce power usage and/or dynamically adjusting the number of hybrid automatic repeat request (HARQ) processes used to transmit audio frames.

The techniques described herein may be implemented in and/or used with a number of different types of devices, including but not limited to cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
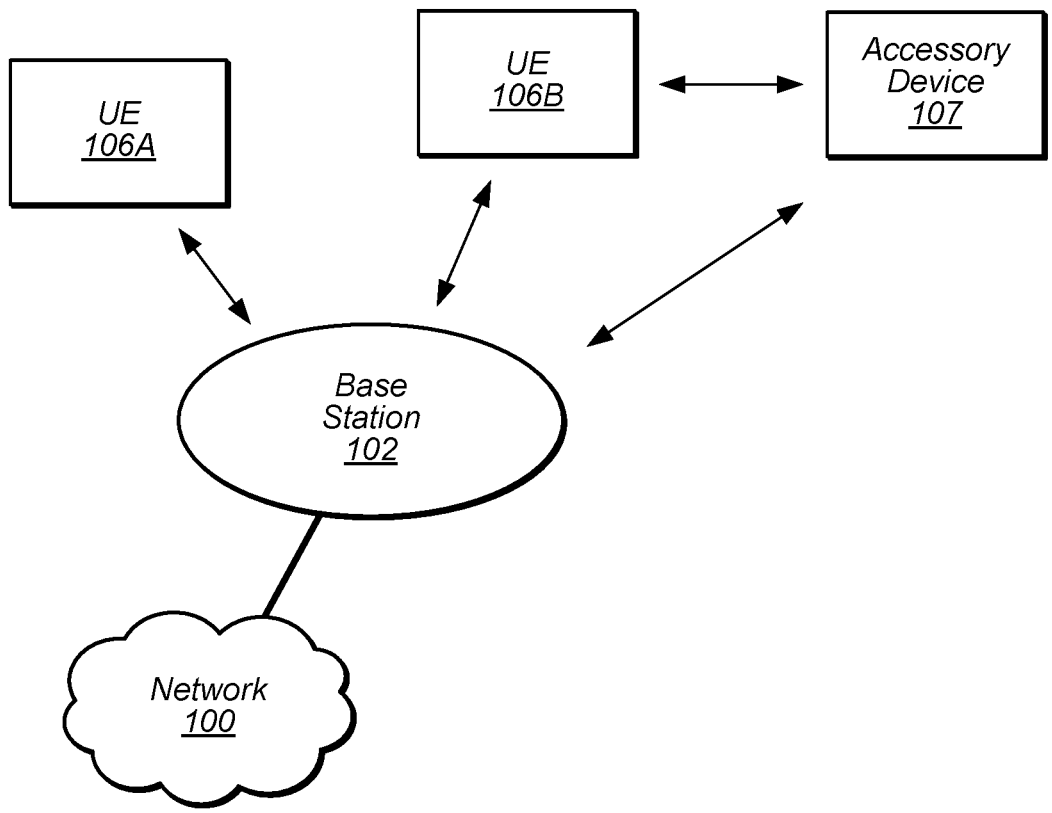
FIG. 1 illustrates an example wireless communication system including an accessory device.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as an accessory device 107. The accessory device 107 may be any of various types of devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of the UE 106B to conduct its cellular communications. The limitation on communication abilities of the accessory device 107 can be permanent, e.g., due to limitations in output power or the radio access technologies (RATs) supported, or temporary, e.g., dues to conditions such as current battery status, inability to access a network, or poor reception.

Figure 2:
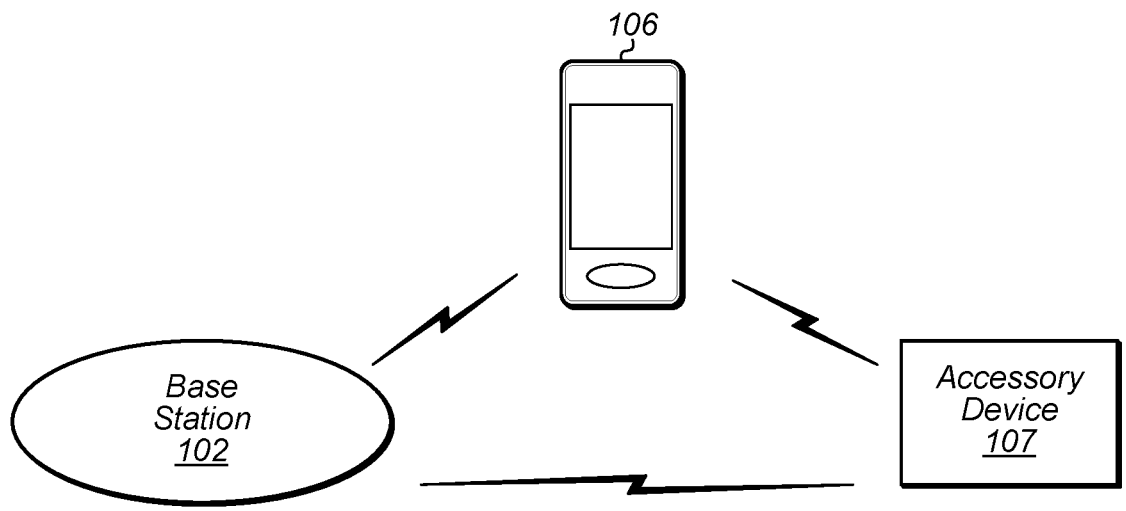
FIG. 2 illustrates an example system where an accessory device can selectively either directly communicate with a cellular base station or utilize the cellular capabilities of an intermediate or proxy device such as a smart phone.

FIG. 2 illustrates an example accessory device 107 in communication with base station 102. The accessory device 107 may be a wearable device such as a smart watch. The accessory device 107 may comprise cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device or intermediate device, using a short range communications protocol, and may then use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The accessory device 107 may include a processor that is configured to execute program instructions stored in memory. The accessory device 107 may perform any of the method embodiments described herein by executing such stored instructions. Alternatively, or in addition, the accessory device 107 may include a programmable hardware element such as an FPGA (field-programmable gate array), or other circuitry, that is configured to perform any of the method embodiments described herein, or any portion of any of the method embodiments described herein.

The accessory device 107 may include one or more antennas for communicating using two or more wireless communication protocols or radio access technologies. In some embodiments, the UE device 106 might be configured to communicate using a single shared radio. The shared radio may couple to a single antenna, or may couple to multiple antennas (e.g., for MIMO) for performing wireless communications. Alternatively, the UE device 106 may include two or more radios. For example, the UE 106 might include a shared radio for communicating using either of LTE (or LTE-Advanced) or Bluetooth, and separate radios for communicating using each of LTE-Advanced and Bluetooth. Other configurations are also possible.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with WiFi capabilities (and possibly limited or no cellular communication capabilities) which is not currently near a WiFi hotspot and hence is not currently able to communicate over WiFi with the Internet. Thus, the term "accessory device" refers to any of various types of devices that in some instances have limited or reduced communication capabilities and hence may selectively and opportunistically utilize the UE 106 as a proxy for communication purposes for one or more applications and/or RATs. When the UE 106 is capable of being used by the accessory device 107 as a proxy, the UE 106 may be referred to as a companion device to the accessory device 107.

Figure 3:
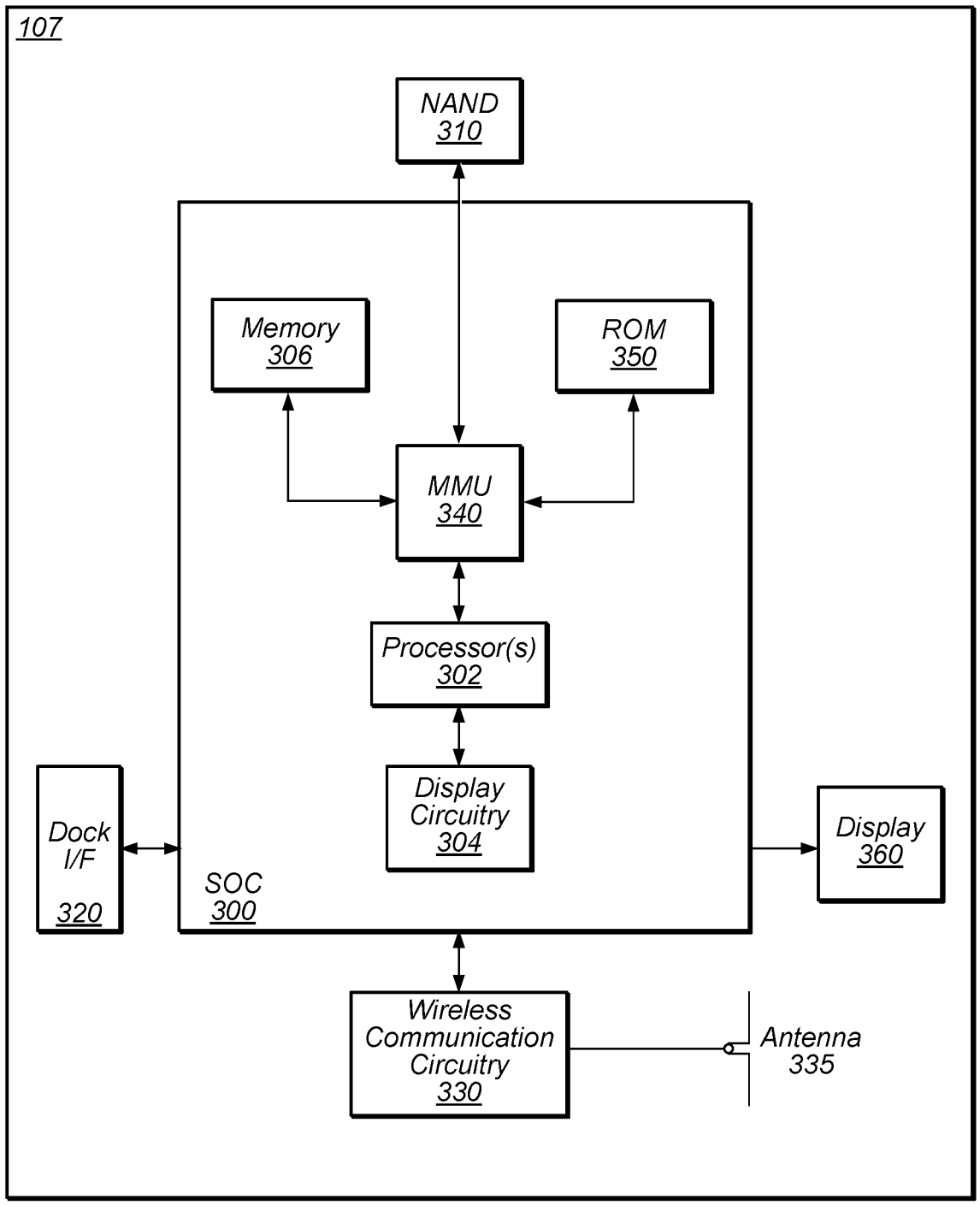
FIG. 3 is a block diagram illustrating an example accessory device.

FIG. 3—Example Block Diagram of an Accessory Device

FIG. 3 illustrates one possible block diagram of an accessory device 107. As shown, the accessory device 107 may include a system on chip (SOC) 300, which may include portions for various purposes. For example, as shown, the SOC 300 may include processor(s) 302 which may execute program instructions for the accessory device 107, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The accessory device 107 may also include other circuits or devices, such as the display circuitry 304, radio 330, connector I/F 320, and/or display 340.

In the embodiment shown, ROM 350 may include a bootloader, which may be executed by the processor(s) 302 during boot up or initialization. As also shown, the SOC 300 may be coupled to various other circuits of the accessory device 107. For example, the accessory device 107 may include various types of memory, a connector interface 320 (e.g., for coupling to a computer system), the display 360, and wireless communication circuitry (e.g., for communication using LTE, CDMA2000, Bluetooth, WiFi, NFC, GPS, etc.).

The accessory device 107 may include at least one antenna, and in some embodiments multiple antennas, for performing wireless communication with base stations and/or other devices. For example, the accessory device 107 may use antenna 335 to perform the wireless communication. As noted above, the UE may in some embodiments be configured to communicate wirelessly using a plurality of wireless communication standards or radio access technologies (RATs).

As described herein, the accessory device 107 may include hardware and software components for implementing methods according to embodiments of this disclosure. The processor 302 of the accessory device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a similar architecture to that described above.

Audio Frame Bundling and Segmentation

Audio frame delay may be one of the most important indicators to measure voice over IP (e.g., voice over LTE (VoLTE)) quality. In some embodiments, audio frame delay may be specified according to the following formula:

$$T\_delay = T\_bundling + T\_wait + T\_transmission$$

Generally, T_delay should be less than or equal to an audio delay budget which is imposed by the network. For example, many networks may use a delay budget of 80 ms, although other values are envisioned.

T_bundling is the audio delay caused by bundling multiple audio frames into an audio bundle for transmission. Generally, T_bundling may be determined using:

$$T\_bundling = (n-1)T$$

where T is the audio sampling rate (e.g., 20 ms) and n is the number of audio frames which are bundled into an audio bundle. For example, using 20 ms:
  1 audio frame in a bundle, T_bundling=0;
  2 audio frames in a bundle, T_bundling=20 ms;
  3 audio frames in a bundle, T_bundling=40 ms;
  4 audio frames in bundle, T_bundling=60 ms.

T_wait may be the time an audio bundle has to wait for an available HARQ process to start transmission.

Finally, T_transmission may be the time an audio bundle takes to transmit successfully (e.g., to a base station or eNodeB). This transmission time may include time for HARQ retransmissions, which may depend heavily on current radio conditions and can vary by a large margin. Accordingly, in some embodiments, in order to meet the audio delay budget (e.g., 80 ms) for different audio bundling schemes, the T_transmission may have a limit as well:
  1-audio bundle, T_transmission<=80 ms;
  2-audio bundle, T_transmission<=60 ms;
  3-audio bundle, T_transmission<=40 ms;
  4-audio bundle, T_transmission<=20 ms.

Figure 4:
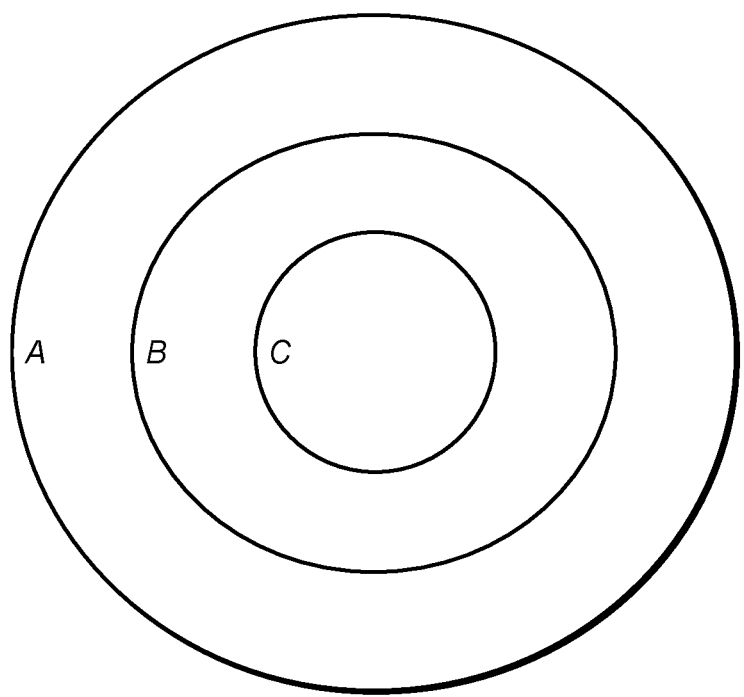
FIG. 4 is an exemplary coverage diagram.

FIG. 4 illustrates an exemplary cell coverage diagram. In some embodiments, the UE 106 may include a plurality of antennas (e.g., two antennas), may not have an RF sensitivity issue, and/or may have enough battery power for contiguous TX at peak power for a long period of time. As a result, in cell coverage B+C, the UE 106 may be within an uplink budget (e.g., a voice over LTE (VoLTE) uplink budget). However, in cell coverage A may involve far cell conditions. In one embodiment, the UE may receive >−80 dBm power from the base station 102 in coverage C, >−90 dBm in coverage B, and <−90 dBm in coverage A.

In some embodiments, accessory device 107 may include a single antenna, incur some RF sensitivity degradation (e.g., 10 dB RF sensitivity degradation) relative to the UE 106, and may include a battery that can support at least 4/8 duty cycle or contiguous TX at peak power for seconds. Similar to UE 106, the accessory device 107 may be within an uplink budget with cell coverage C. However, in cell coverage B or A and beyond, far cell conditions may apply.

In far cell conditions, or range limited devices, such as the accessory device 107, there may be two methods to extend the link or audio delay budget (although more are also envisioned):

1) reduce payload for transmission, which is the size of an audio bundle; or 2) increase number of HARQ retransmissions, which is limited by the T_transmission limit mentioned above.

For a fixed audio bundle size, RLC (radio link control) segmentation may be used to extend link budget without increasing the number of HARQ retransmissions to avoid exceeding the audio delay budget. RLC segmentation, which uses the RLC protocol to segment a RLC PDU (packet data unit) to several RLC segment PDUs, may involve transmitting all RLC segments using multiple HARQ processes in parallel, instead of one HARQ process for an entire audio bundle. This method may effectively decrease payload size and thus extend link budget.

Figure 5:
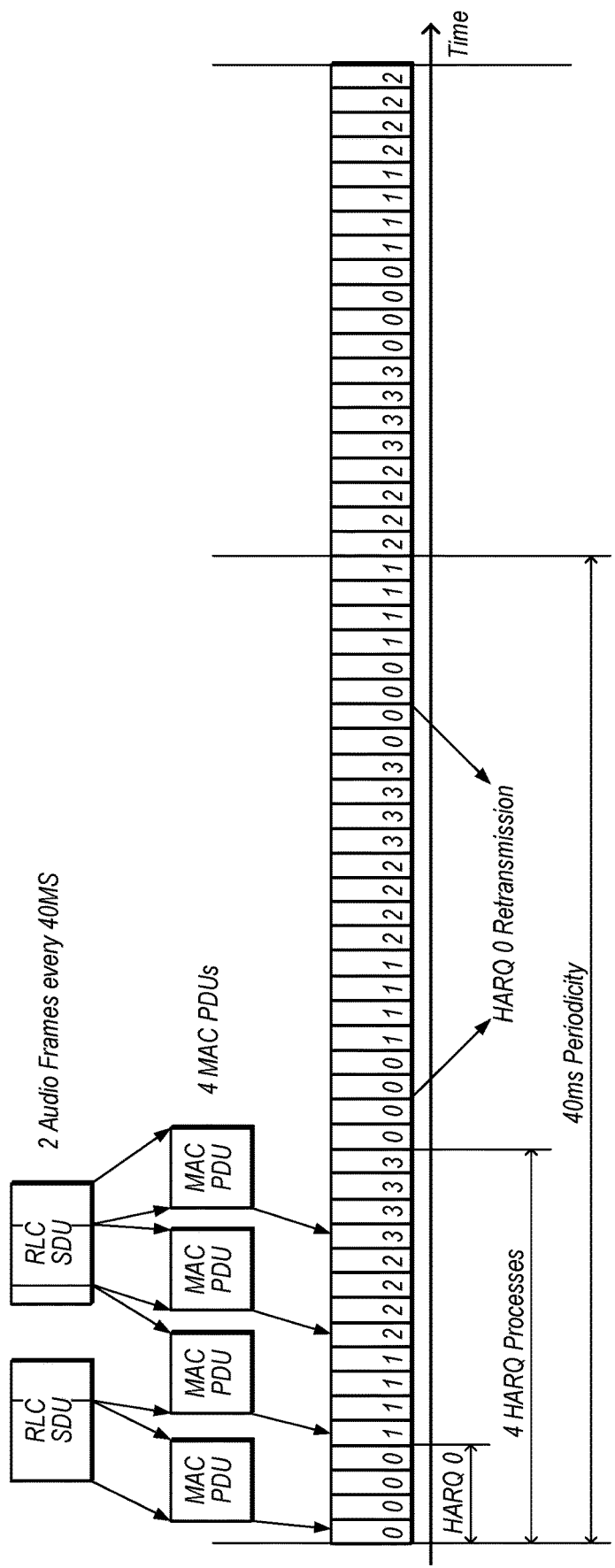
FIG. 5 illustrates exemplary RLC segmentation.

As shown in FIG. 5, when using RLC segmentation, two audio frames received per 40 ms may be segmented as RLC SDUs into a maximum of four RLC segments and fill in the four HARQ processes, and with each HARQ process retransmitting 2 to 3 times, this leads to contiguous transmission over the entire 40 ms period.

While RLC segmentation allows higher total energy accumulation within a delay budget, it involves extra overhead due to extra RLC and MAC headers resulting in a higher data rate, thus lower accumulated energy per payload bit. Additionally, because an RLC PDU (the original audio bundle) is segmented into several RLC segment PDUs for transmission, the receiver (e.g., the base station) may have to successfully receive all RLC segments and then re-assemble them back into the original audio bundle without any of the RLC segments being lost. Thus, if any segment is lost, then even if all the other segments are received correctly, the entire audio bundle may still be lost. Thus, RLC segmentation can lead to excessive queuing delay due to network device(s) having to reassemble all segments back to one complete RLC PDU (packet data unit). For example, if one segment is missing for a long period of time, it could lead to audio frame build-up delay and get dropped, resulting in the link budget being limited.

Moreover, if P is the block error rate for a RLC segment, and if one bundle is segmented to two segments:

$$(1-P)*(1-P)=1-n\%$$

where n is the target block error rate (BLER) that may be configured by the network and P is the BLER target for each segment. According to this relationship, as RLC segments increase, the P value decreases. For example, 1% may be the typical VoLTE BLER configured by the network. Accordingly, for two segments, P=0.5%, which means each RLC segment BLER target has to be 0.5% in order to achieve the original audio bundle BLER of 1%. For three RLC segments, each RLC segment BLER target may have to be 0.3%, in order to achieve original audio bundle BLER 1%. As a result, there is link budget loss for RLC segmentation. However, this loss may be avoided according to some embodiments described herein. In particular, more efficient accumulation of energy per payload bit may be attained than through RLC segmentation, which may enhance uplink budget with minimal or no changes on the network side.

As an example, an exemplary network configuration may specify a codec of 12.65 Kbps, and two audio frames may be bundled into an audio bundle that is transmitted every 40 ms. In this example, the audio bundle size may be (253 bits+40 bites ROHC/PDCP header)*2+16 bits RLC/MAC header=586 bits+16 bits RLC/MAC header=602 bits. Accordingly, if the network provides an uplink grant transport block size (TBS) that is greater than or equal to 602 bits, then this audio bundle can be transmitted in one TTI (transmission time interval). However, if the uplink grant TBS is less than 602 bits (e.g., 301 bits), then the transmitting device cannot transmit the entire audio bundle in one TTI.

Accordingly, to avoid RLC segmentation, the audio frames may be separated at the audio bundle level instead of at RLC PDU level in some embodiments. Following the example above, where the uplink grant size is 301 bits and the audio bundle has two audio frames, the audio bundle may be reduced to a single audio frame, thus splitting the audio bundle into two transmissions, each matching the uplink grant size and avoiding RLC segmentation. Thus, RLC segmentation is no longer necessary, and if any one of the two audio bundles is lost, the other one still can be decoded and processed as an independent audio bundle. A similar procedure may be applied to audio bundles having more audio frames. For example, an audio bundle having three audio frames may be segmented into three independent audio bundles, each including one audio frame. For an audio bundle having four audio frames, it may be segmented into four independent audio bundles, each includes one audio frame, or two independent audio bundles, each including two audio frames, as desired. Other bundles and segmentations are envisioned.

This procedure can also be extended to the audio frame itself. For example, if an audio frame is coded by 12.65 kbps, it may have a size of 253 bits. This audio bundle can be segmented and re-packed into two audio frames each with a codec rate 6.6 kbps, having a size of 132 bits. Accordingly, these two independent audio bundles may be transmitted to the network, instead of two RLC segments.

Figure 6:
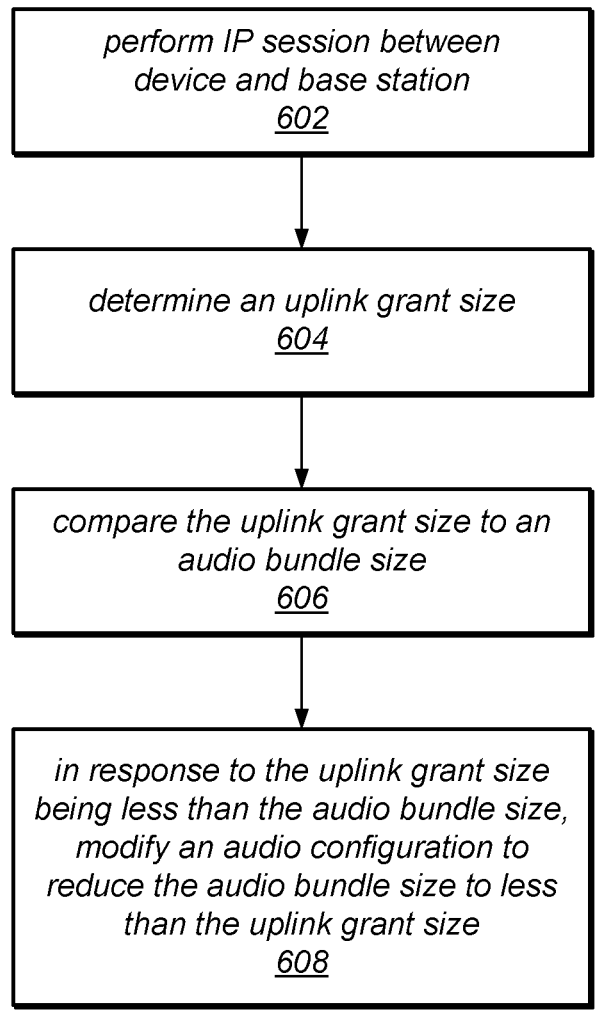
FIG. 6 is a flowchart diagram illustrating a method whereby a audio frame bundles may be segmented.

FIG. 6—Audio Frame Bundle Segmentation

FIG. 6 is a flowchart diagram illustrating a method for performing audio frame bundle segmentation. The method may be performed by an accessory device (such as accessory device 107) and/or a UE device (such as UE 106), e.g., using the systems and methods discussed above. More generally, the method shown in FIG. 6 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 602, device may perform a real-time IP session, e.g., including voice or video over IP session, such as VoLTE. For the remainder of this description, the session may be referred to as a voice over IP session involving audio frames and audio bundles, but it may be extended to video frames and video bundles or any transmissions associated with a real-time IP session or application, etc.

In 604, the device may determine or receive an uplink grant size for VoIP session. For example, the device may receive an uplink grant transport block size that specifies a number of bits for audio bundles of the VoIP session.

In 606, the device may compare the uplink grant size to the audio bundle size of the present audio configuration. The audio bundle size may be based on the audio codec in use, the number of audio frames in the audio bundle, etc. specified by the audio configuration.

In 608, in response to the uplink grant size being less than the audio bundle size, the device may modify the audio configuration to reduce the audio bundle size to less than or equal to the uplink grant size, e.g., to avoid RLC segmentation. For example, if the present audio bundle size is 602 bits and the uplink grant size is 301 bits, and the number of audio frames per bundle is greater than one (e.g., two), then the number of audio frames per bundle may be reduced, e.g., in this example to one audio frame per bundle. Similarly, audio bundles of three audio frames may be split into single audio frames per bundle. Audio bundles of four audio frames may be split into single audio framer per bundle or two frames per bundle, depending on the ratio of the uplink grant size to the audio bundle size (e.g., two frames per bundle may be used, if possible).

However, if the audio frames per bundle is already one, it may be resampled using a different codec rate. For example, if an audio frame is coded by 12.65 kbps, it may have a size of 253 bits. This audio bundle can be segmented and re-packed into two audio frames each with a codec rate 6.6 kbps, having a size of 132 bits. Thus, even single audio frames can be reduced in size via a codec rate change (among other possibilities) rather than using RLC segmentation.

Dynamically Enhancing Uplink Budget

Referring back to FIG. 4, in cell coverage A, TTI (time transmission interval) bundling (e.g., 4-TTI-B) may be enabled for the UE. In some embodiments, it may be typical to implement RLC segmentation beyond cell coverage A. Similar to UE 106, the accessory device 107 may be within an uplink budget with cell coverage C. However, in cell coverage B, TTI bundling (e.g., 4 TTI-B) may be enabled. In cell coverage A and beyond A, various embodiments described herein may be particularly useful.

In some implementations (e.g., for LTE VoLTE) 4-TTI bundling, HARQ (hybrid automatic repeat request) retransmission, and/or RLC (radio link control) segmentation may be used to extend uplink budget while experiencing weak cell conditions (e.g., conditions associated with cell coverage A in FIG. 4).

In some embodiments, after TTI bundling is enabled by the network after detecting weak cell radio conditions, the audio codec rate (e.g., of the accessory device 107, although some embodiments may also apply to the UE 106) can be reduced to a minimum value such as a lowest WB-AMR (wideband adaptive multi-rate) rate of 6.6 kbps, which utilizes the minimum uplink grant (MCS (modulation and coding scheme)+number of PRBs (physical resource blocks)) to allow only one MAC (media access control) PDU without RLC segmentation, similar to discussions above. For example, audio frame(s) may be bundled to within one MAC PDU, thereby avoiding RLC segmentation. This reduction in the audio codec rate may allow one MAC PDU in one HARQ process (such as HARQ process 0) to be transmitted four times in one TTI bundle, and the TTI bundle can be retransmitted N times through HARQ, depending on the retransmissions allowed (e.g., four times for 4-TTI-B).

In some embodiments, the accessory device 107 (and/or the UE 106) may measure the UL block error rate (BLER) by counting ACK/NACKs on HARQ process 0. If the BLER is more than a threshold (e.g., 10%), the device 107 may transmit an uplink buffer status message to indicate to the network that there are more buffers for a given MAC PDU pending for transmission. Accordingly, the network may allocate an uplink grant for another not-yet-used HARQ process, and the device 107 may start to transmit the same MAC PDU on the not-yet-used HARQ process (such as HARQ process 1). This effectively doubles the number of transmissions for the MAC PDU.

In some embodiments, the accessory device 107 (and/or the UE 106) may measure joint uplink BLER by counting ACK/NACKs on both HARQ processes 0 and 1. Similar to the above, if the BLER is more than a threshold (e.g., 10%), the device 107 may transmit an uplink buffer status message to indicate to the network that there are more buffers for a given MAC PDU pending for transmission. Again, the network may allocate an uplink grant, and the device may start to transmit the same MAC PDU on another not-yet-used HARQ process (such as HARQ 2). This effectively generates three times the number of transmissions for the MAC PDU.

In some embodiments, the accessory device 107 (and/or the UE 106) may measure joint uplink BLER by counting ACK/NACKs on HARQ processes 0, 1, and 2. If the BLER is more than a threshold (e.g., 10%), the device 107 may send an UL buffer status message to indicate to the network that there are more buffers for a given MAC PDU pending for transmission. Again, the network may allocate an uplink grant, and the device 107 may start to transmit the same MAC PDU on another not-yet-used HARQ process (such as HARQ process 3). This effectively generates four times number of transmissions for the MAC PDU.

In some embodiments, whenever the above mentioned joint UL BLER is less than a threshold (e.g., 5%), the device may stop transmitting a given MAC PDU on a HARQ process. For example, the device may remove HARQ processes from the joint HARQ group until there is only one left, effectively reducing the number of maximum possible retransmissions progressively down to only one HARQ active process.

These described embodiments may not need changes on the network side. In particular, by transmitting the same MAC PDU on multiple HARQ processes, energy accumulation may be increased per payload bit from the network side, thereby increasing the chances of correctly decoding payload data. Moreover, since the RLC PDU has sequence number in it, RLC can discard the duplicates one if more than one HARQ processes has correctly decoded the MAC PDU.

In some embodiments, to further increase the network decoding efficiency, the network can combine received contents from the above mentioned multiple HARQ processes, which may effectively produce the same as 4 ms TTI bundling, 8 ms TTI bundling, 12 ms TTI bundling, and/or 16 ms TTI bundling, as each HARQ process is added. In some embodiments, even without TTI bundling enabled by the network, a similar approach can also be applied to embodiments in which 8 UL HARQ processes are used.

Figure 7:
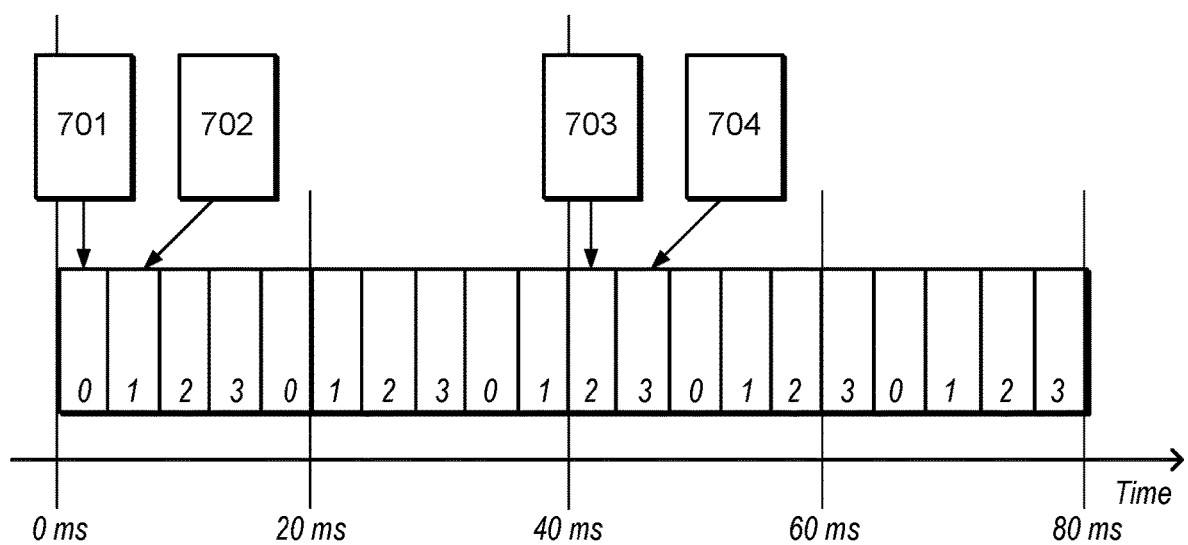
FIG. 7 illustrates an exemplary retransmission scheme.

In the example of FIG. 7, the accessory device 107 (and/or the UE 106) receives two audio frames per 40 ms interval to be transmitted, with a delay budget of 80 ms and with 4-TTI-B enabled. In FIG. 7, each number 0 through 3 represents a HARQ process with a total of four HARQ processes. Additionally, the HARQ retransmission count may be set to four so that one HARQ process can transmit the same PDU 5 times within the 80 ms delay budget, as shown in the diagram. After enabling 4-TTI-B, in each 80 ms period, two MAC PDUs (701 and 703) are transmitted starting in adjacent 40 ms intervals, each occupying one HARQ process (0 and 2, respectively), and each including two bundled audio frames. Accordingly, in this example, there are two HARQ processes that are not used (1 and 3). Thus, the device may send one MAC PDU per 40 ms to the network. If each HARQ process (0 and 2 in this example) retransmits four times, then within an 80 ms period, the device can transmit two MAC PDUs, each with a number of transmissions of 4×5=20.

However, if twenty transmissions of a MAC PDU is still not enough for the network to accumulate sufficient energy per payload bit for acceptable reception quality, in some embodiments, the device can transmit the MAC PDU on another not-yet-used HARQ process (process 0 and process 1 for the 701 and 702 MAC PDUs and process 2 and process 3 for the 703 and 704 MAC PDUs, each set corresponding to a corresponding audio frame bundle). This may effectively double the number of transmission for each MAC PDU. Accordingly, in an 80 ms period, the device can transmit two MAC PDUs, each with number of transmissions of 2×4×5=40.

Figure 8:
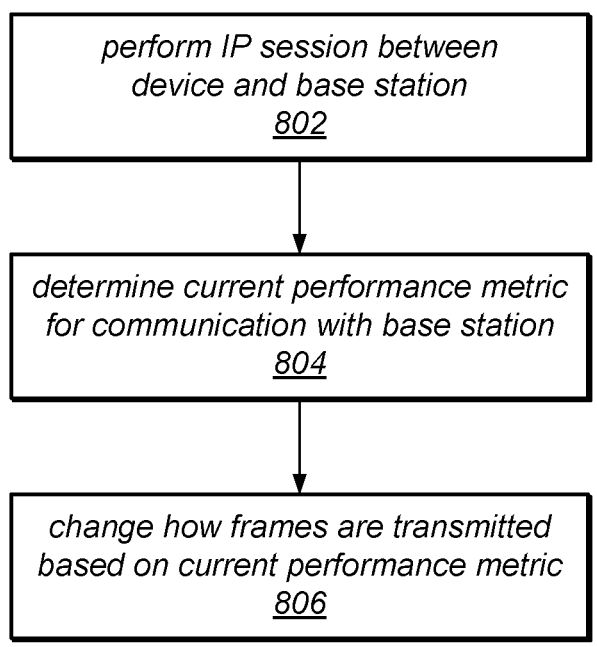
FIG. 8 is a flowchart diagram illustrating a method for performing dynamic HARQ process selection for audio frame transmission.

FIG. 8—Dynamic HARQ Process Selection for Audio Frame Transmission

FIG. 8 is a flowchart diagram illustrating a method for performing dynamic HARQ process selection for audio frame transmission. The method may be performed by an accessory device (such as accessory device 107) and/or a UE device (such as UE 106), e.g., using the systems and methods discussed above. More generally, the method shown in FIG. 8 may be used in conjunction with any of the systems or devices shown in the above Figures, among other devices. In various embodiments, some of the method elements shown may be performed concurrently, in a different order than shown, or may be omitted. Note also that additional method elements may also be performed as desired. The method may be performed as follows.

In 802, a device may perform a real-time IP session, e.g., including voice or video over IP session, such as VoLTE. In 802, the device may communicate with a base station and have a first performance metric (e.g., signal to noise ratio (SNR), block error rate (BLER), received signal strength indication (RSSI), reference signal received power (RSRP), reference signal received quality (RSRQ), and/or any other metric or combination of metrics). The device may transmit frames (e.g., audio frames) for the session using a first audio codec rate, a first MAC PDU size, a first frame bundling scheme, a first retransmission scheme, and/or a first one or more HARQ processes. In some embodiments, the first performance metric may be above a performance metric threshold. When above the threshold, retransmission and/or HARQ may not be performed (e.g., if coverage corresponds to C, discussed above). Alternatively, a first retransmission scheme and/or one or more HARQ processes may be used in 702 (e.g., if coverage corresponds to B or A, discussed above).

In 804, the device may determine a current performance metric (which may be referred to as a "second performance metric").

In 806, based on current performance, the device may change how frames are transmitted. For example, in response to current performance falling below an acceptable rate (e.g., the second performance metric falling below the performance metric threshold), the device may modify one or more activities to attempt to ensure proper delivery of the frames (e.g., the audio frames) for the session. For example, the device may lower the audio codec rate, e.g., in order to allow each frame or frame bundle to fit within a single MAC PDU rather than using RLC segmentation. Additionally, or alternatively, a second or different retransmission scheme may be used (e.g., 4-TTI-B, 2-TTI-B, etc.). Further, additional available HARQ processes may be used to increase retransmissions of audio frames or audio frame bundles. The MAC PDU size may also be modified, if desired.

In one embodiment, the device may measure a BLER of transmitted frames or bundles, and if it exceeds a threshold, additional retransmissions or HARQ processes may be used to ensure proper reception of the frames.

In some embodiments, 804 and 806 may be repeated throughout the session. While performance remains unacceptable (e.g., falling below the performance metric threshold), additional retransmissions and/or HARQ processes may be used (among other possibilities). If performance improves, these changes may be reversed, e.g., increasing audio codec rate, decreasing retransmissions, decreasing HARQ process use, etc. These changes may result in better battery utilization and/or better audio quality, depending on the changes.

Dynamic Audio Frame Bundling

In some embodiments, accumulating more energy per payload bit in an IP session (e.g., a VoLTE) delay budget may be beneficial in increasing uplink budget.

As discussed above, in some embodiments, the payload size may be reduced. For example, the audio payload may be reduced, by using a lower audio codec rate. As a specific example, reducing the rate from AMR-WB 12.65 kbps down to AMR-WB-6.6 kbps may provide approximately a 3 dB gain in link budget associated with a 50% rate decrease.

Additionally or alternatively, the protocol header overhead may be minimized. For example, fixed-sized UDP/IP/RTP, PDCP/RLC/MAC header overhead (7 bytes) over a bundle of multiple audio frames may be implemented instead of over one single audio frame (e.g., 1 audio frame per 20 ms, 2 audio frames in a bundle per 40 ms, 3 audio frames in a bundle per 60 ms), which may provide 0.6 dB gain in link budget associated with the header overhead reduction.

One audio bundle may be segmented into multiple RLC segment PDUs that are transmitted over multiple HARQ processes instead of one HARQ process. However, as discussed above, RLC segmentation may increase RLC/MAC header overhead per segment, thus increasing overall payload size. Additionally, more segments may also delay RLC PDU reassembly and lead to excessive queuing delay, thus potentially causing discards of audio frames.

Instead of segmentation, the same RLC PDU can be retransmitted multiple times from the RLC level such that the full RLC PDU is retransmitted as a MAC PDU over each one of multiple HARQ processes. This technique may not cause delay on RLC reassembly and may effectively increase the number of retransmissions that can be performed per audio payload.

Improvements may also be implemented by increasing the number of retransmissions for an audio frame within the delay budget (e.g., the VoLTE delay budget). The delay budget may be a network parameter. As one example, since the PDCP (packet data convergence protocol) discard timer can often be set to 100 ms, and the maximum HARQ transmission number can often be set to 5, the delay budget between the device and the base station (e.g., the eNodeB) may be 80 ms (5 HARQ retransmissions×4 HARQ processes×4-TTI bundling).

For the 4-TTI-B case using an AMR-WB 6.6 kbps codec, one audio frame with 132 bits per 20 ms can be retransmitted a maximum of 20 times and may have the best link budget. In the case of one audio frame per 20 ms, using four HARQ processes out of four, the device can transmit four audio frames in 80 ms, each frame being retransmitted a maximum of 20 times. In the case of two audio frames as a bundle per 40 ms, using two HARQ processes out of four, the device can transmit two bundles in 80 ms, each bundle being retransmitted a maximum of 20 times. In the case of three audio frames as a bundle per 60 ms, using two HARQ processes out of four, the device can transmit two bundles in 80 ms, each bundle being retransmitted a maximum of 20 times.

For the 2-TTI-B case using an AMR-WB 6.6 kbps codec, one audio frame with 132 bits per 20 ms can be retransmitted a maximum of 20 times and may have the best link budget. In the case of one audio frame per 20 ms, using four HARQ processes out of four, the device can transmit four audio frames in 80 ms, each frame retransmitting a maximum of 20 times. In the case of two audio frames as a bundle per 40 ms, using two HARQ processes out of four, the device can transmit two bundles in 80 ms, each bundle retransmitting a maximum of 20 times. In the case of three audio frames as a bundle per 60 ms, using two HARQ processes out of four, the device can transmit two bundles in 80 ms, each bundle retransmitting a maximum of 20 times.

For a case involving no TTI bundling using an AMR-WB 6.6 kbps codec, one audio frame with 132 bits per 20 ms can be retransmitted a maximum of 10 times, and has the best link budget. Each audio frame of the total four audio frames may be retransmitted in 80 ms on the other un-used four HARQ processes, so one audio frame with 132 bits per 20 ms can be retransmitted a maximum of 20 times and may have the best link budget. In the case of one audio frame per 20 ms, using four HARQ processes out of eight, the device can transmit four audio frames in 80 ms, each frame retransmitting a maximum of 10 times. In the case of two audio frames as a bundle per 40 ms, using two HARQ processes out of eight, the device can transmit two bundles in 80 ms, each bundle retransmitting a maximum of 10 times. In the case of three audio frames as a bundle per 60 ms, using two HARQ processes out of eight, the device can transmit two bundles in 80 ms, each bundle retransmitting a maximum of 10 times.

Figure 9:
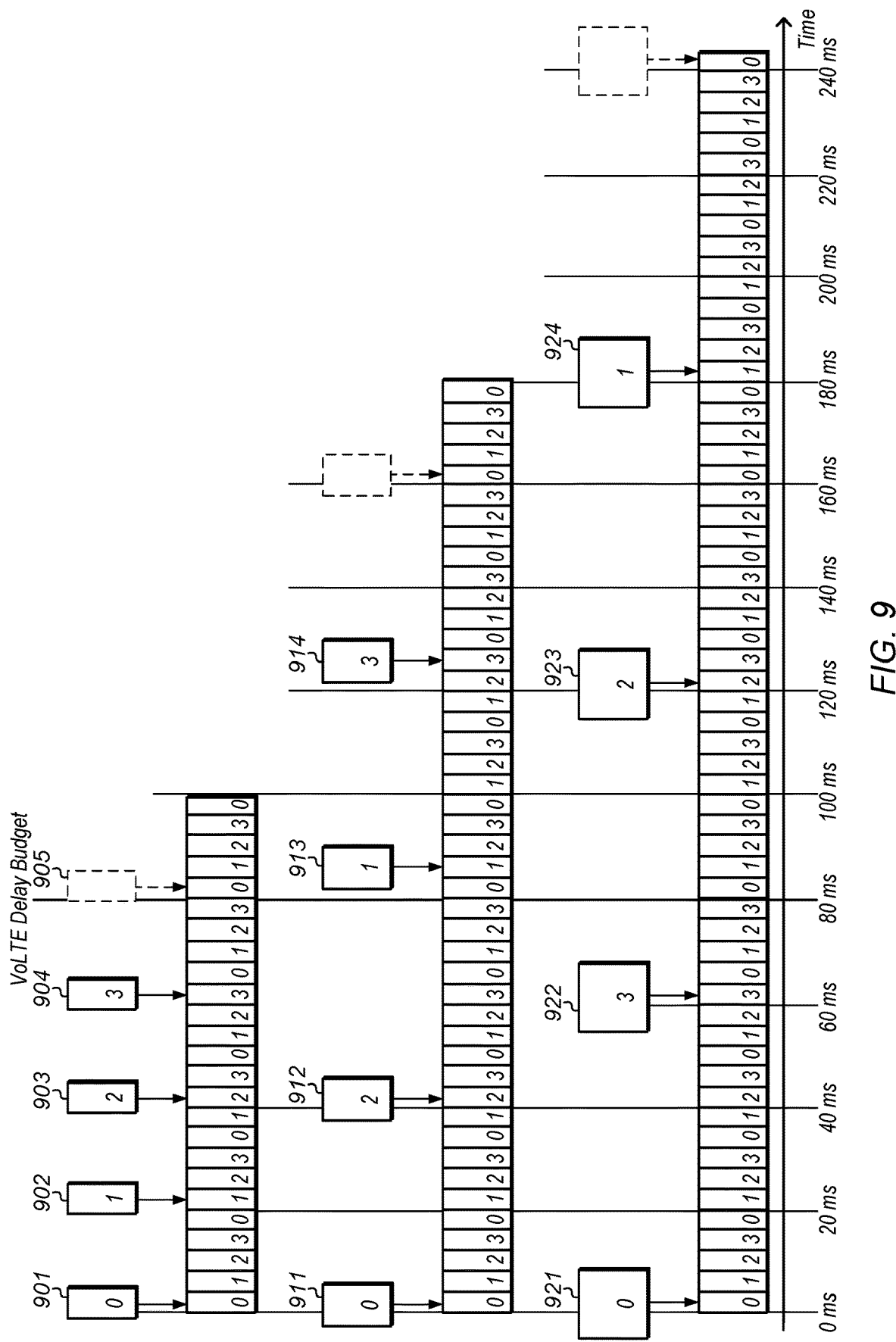
FIGS. 9-11 illustrate exemplary retransmission schemes.

FIG. 9 illustrates 4-TTI-B with audio frame periodicity of 20 ms, 40 ms, and 60 ms. For an audio frame periodicity of 20 ms, FIG. 9 illustrates one audio frame with 132 bits in a MAC PDU. Accordingly, four different MAC PDUs may be transmitted in 80 ms, each MAC PDU in a different HARQ process, each of which can retransmit a maximum of 20 times (4 TTI bundling×5 transmissions). In particular, audio frames 901, 902, 903, and 904 are transmitted using HARQ processes 0, 1, 2, and 3. Audio frame 905 represents the end of the delay budget of 80 ms for audio frame 901 and the point where HARQ process 0 is reused for a new audio frame.

For an audio frame periodicity of 40 ms, FIG. 9 illustrates two audio frames with 264 bits in a MAC PDU. Accordingly, two different MAC PDUs may be transmitted in 80 ms, each MAC PDU in a different HARQ process, each of which can retransmit a maximum of 20 times. In particular, audio frame bundles 911, 912, 913, and 914 are transmitted using HARQ processes 0, 2, 1, and 3, respectively.

For an audio frame periodicity of 60 ms, FIG. 9 illustrates three audio frames with 396 bits in a MAC PDU. Accordingly, two different MAC PDUs may be transmitted in 80 ms, each MAC PDU in a different HARQ process, each of which can retransmit a maximum of 20 times. In particular, audio frame bundles 921, 922, 923, and 924 are transmitted using HARQ processes 0, 3, 2, and 1, respectively.

Figure 10:
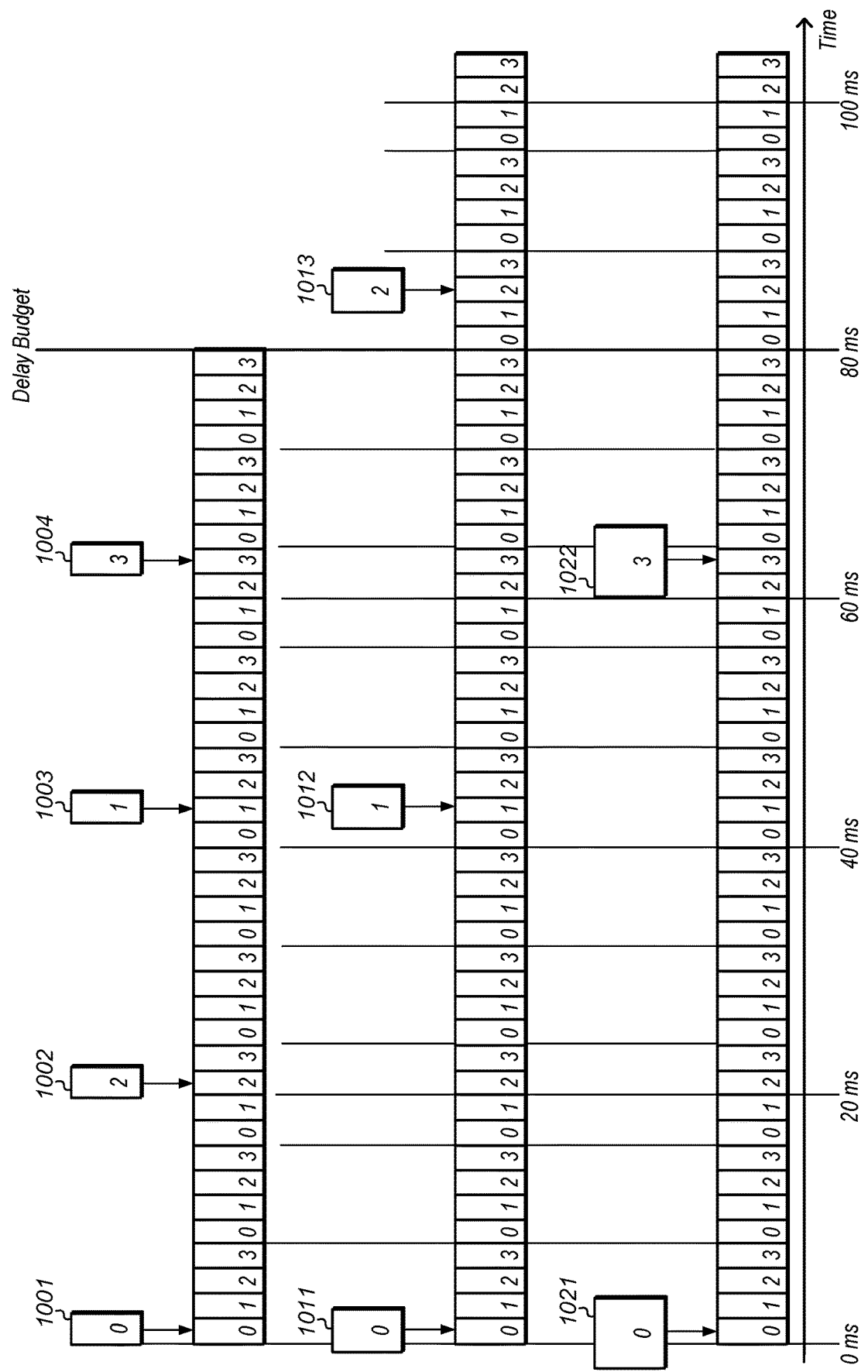

FIG. 10 illustrates 2-TTI-B with audio frame periodicity of 20 ms, 40 ms, and 60 ms. For an audio frame periodicity of 20 ms, FIG. 10 illustrates a single audio frame with 132 bits in one MAC PDU. Accordingly, four MAC PDUs may be transmitted in 80 ms, each MAC PDU in a different HARQ process, each of which can retransmit a maximum of 20 times (2-TTI bundling×10 transmissions). In particular, audio frames 1001, 1002, 1003, and 1004 are transmitted using HARQ processes 0, 2, 1, and 3, respectively.

For an audio frame periodicity of 40 ms, FIG. 10 illustrates two audio frames with 264 bits in one MAC PDU. Accordingly, two MAC PDUs may be transmitted in 80 ms, each MAC PDU in a different HARQ process, each of which can retransmit a maximum of 20 times (2-TTI bundling×10 transmissions). In particular, audio frame bundles 1011, 1012, and 1013 are transmitted using HARQ processes 0, 1, and 2, respectively.

For an audio frame periodicity of 60 ms, FIG. 10 illustrates three audio frames with 396 bits in one MAC PDU. Accordingly, two MAC PDUs may be transmitted in 80 ms, each MAC PDU in a different HARQ process, each of which can retransmit a maximum of 20 times. In particular, audio frame bundles 1021 and 1022 are transmitted using HARQ processes 0 and 3, respectively.

Figure 11:
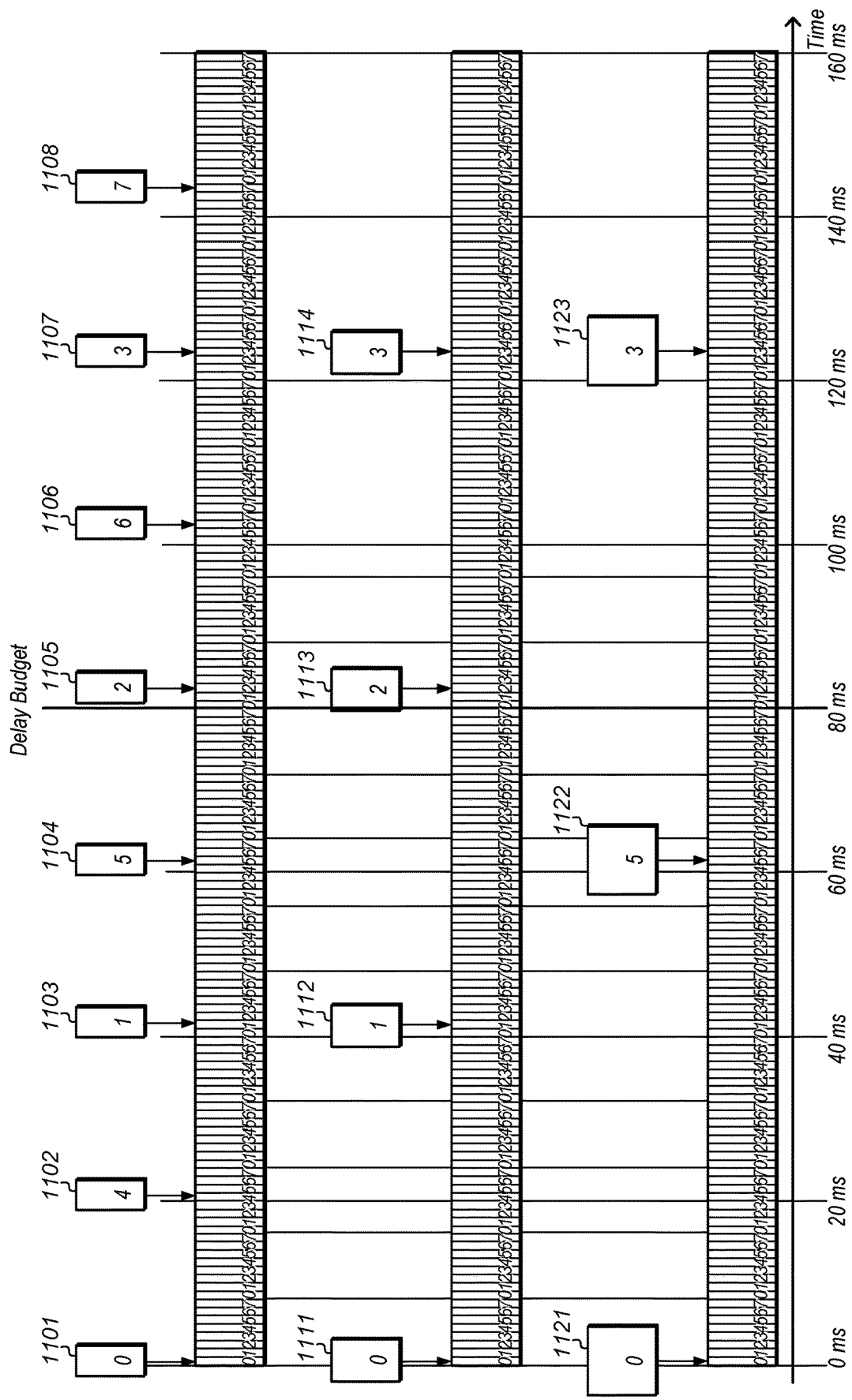

FIG. 11 illustrates 1TTI with 20 ms, 40 ms, and 60 ms audio frame periodicity. For an audio frame periodicity of 20 ms, FIG. 11 illustrates a single audio frame with 132 bits in a MAC PDU. Accordingly, four MAC PDUs may be transmitted in 80 ms, each MAC PDU in a different HARQ process, each of which can retransmit a maximum of 10 times. In this example, audio frames 1101, 1102, 1103, 1104, 1105, 1106, 1107, and 1108 are transmitted using HARQ processes 0, 4, 1, 5, 2, 5, 3, and 7, respectively.

For an audio frame periodicity of 40 ms, FIG. 11 illustrates two audio frames with 264 bits in a MAC PDU. Accordingly, two MAC PDUs may be transmitted in 80 ms, each MAC PDU in a different HARQ process, each of which can retransmit a maximum of 10 times. In particular, audio frame bundles 1111, 1112, 1113, and 1114 are transmitted using HARQ processes 0, 1, 2, and 3, respectively.

For an audio frame periodicity of 60 ms, FIG. 11 illustrates three audio frames with 396 bits in a MAC PDU. Accordingly, two MAC PDUs may be transmitted in 80 ms, each MAC PDU in a different HARQ process, each of which can retransmit a maximum of 10 times. In particular, audio frame bundles 1121, 1122, and 1123 are transmitted using HARQ processes 0, 5, and 3, respectively.

Note that in FIGS. 9-11, more retransmissions may be possible for certain configurations. For example, for audio frame periodicities of 40 ms and 60 ms in FIGS. 8-10 as well as 20 ms in FIG. 11, more retransmissions may be possible within the 80 ms budget by using additional HARQ processes. However, the larger bundles may use more power and a larger network uplink grant (resource). Additionally, by avoiding using all of the HARQ processes, the device may be able to sleep more often and conserve battery power. Of course, where weaker radio conditions occur, these additional HARQ processes and retransmissions may be used to ensure proper payload delivery.

In some embodiments, in coverage area C, a normal configuration may be used, e.g., CDRX 40 ms, two audio frame bundling into one PDCP/RLC/MAC PDU every 40 ms, the MAC PDU is transmitted on one HARQ process, RTT 8 ms, normally retransmit 1-2 times, maximum number of retransmissions five times. With the device's (e.g., the accessory device 107 and/or the UE 106) measurement reports assistance, the network may enable 4-TTI-B when it detects the device enters coverage area B. The device may negotiate with the network to downgrade the audio codec to AMR-WB 6.6 kbps and use a 4-TTI-B configuration, e.g., CDRX 40 ms, two audio frame bundling into one PDCP/RLC/MAC PDU every 40 ms, then MAC PDU is transmitted on one HARQ process, each transmission is 4-TTI bundling, RTT 16 ms, normally retransmit 1-2 times, maximum number of retransmission three times.

However, in some embodiments, after the device enters cell coverage area B, if 4-TTI-B is not supported by the network, if the number of HARQ retransmissions increases to more than three and if the second audio frame arrives before first audio frame has been acknowledged, the second audio frame should use an unused HARQ process instead of overriding a currently used HARQ process, which may allow for two HARQ processes being active in transmission.

If any one of the HARQ retransmission counts increases to five, and five is the max number configured by the network, which may be typical, the device may transmit the audio frame again as a new MAC PDU on the currently used HARQ process, which may enable another maximum five retransmissions per HARQ process.

After the device enters coverage area A, the number of 4-TTI-B retransmissions may increase to more than three times. When the second bundle of two audio frames arrives before the first bundle has been acknowledged, the second bundle should use an unused HARQ process instead of overriding a currently used HARQ process, so two HARQ processes are active in transmission. If any of the HARQ processes' number of retransmissions reaches five, and this situation persists for a certain period of time, the device should switch to one audio frame bundle per 20 ms stage.

If 4-TTI-B is not supported by the network and if any of the HARQ processes' number of retransmissions reaches 10 and the situation persists for a certain period of time, the device may switch to one audio frame bundle per 20 ms stage.

If there is one audio frame bundle per 20 ms stage, one audio frame may be encapsulated into one MAC PDU per 20 ms and the MAC PDU may be transmitted on one HARQ process. Each transmission may use 4-TTI bundling, RTT 16 ms, and up to five retransmissions. When a new audio frame is received per 20 ms before the current used HARQ processes are acknowledged, an unused HARQ process may be used instead of overriding a currently used HARQ process until no unused HARQ process is available. Eventually, all four HARQ processes can be actively used, and the device may be continuously transmitting over the 80 ms period.

If 4-TTI-B is not supported by the network, each HARQ transmission may be set to 1-TTI, RTT 8 ms, with up to five retransmissions. When a new audio frame is received per 20 ms before used HARQ processes are acknowledged, an unused HARQ process may be used instead of overriding a currently used HARQ process until no unused HARQ process is available.

If any one of the HARQ retransmission counts increases to five, and five is the maximum typically configured by the network, the device may transmit the audio frame again as a new MAC PDU on the currently used HARQ process. This may enable another 5 retransmissions per HARQ process. If any one of the HARQ retransmission total counts increases to 10, and five is the maximum typically configured by the network, the device may transmit the audio frame again as a new MAC PDU on an unused HARQ process, which may enable another 10 retransmissions per HARQ process. Eventually all eight HARQ processes can be actively used for four audio frames, each audio frame occupying two HARQ processes.

Figure 12:
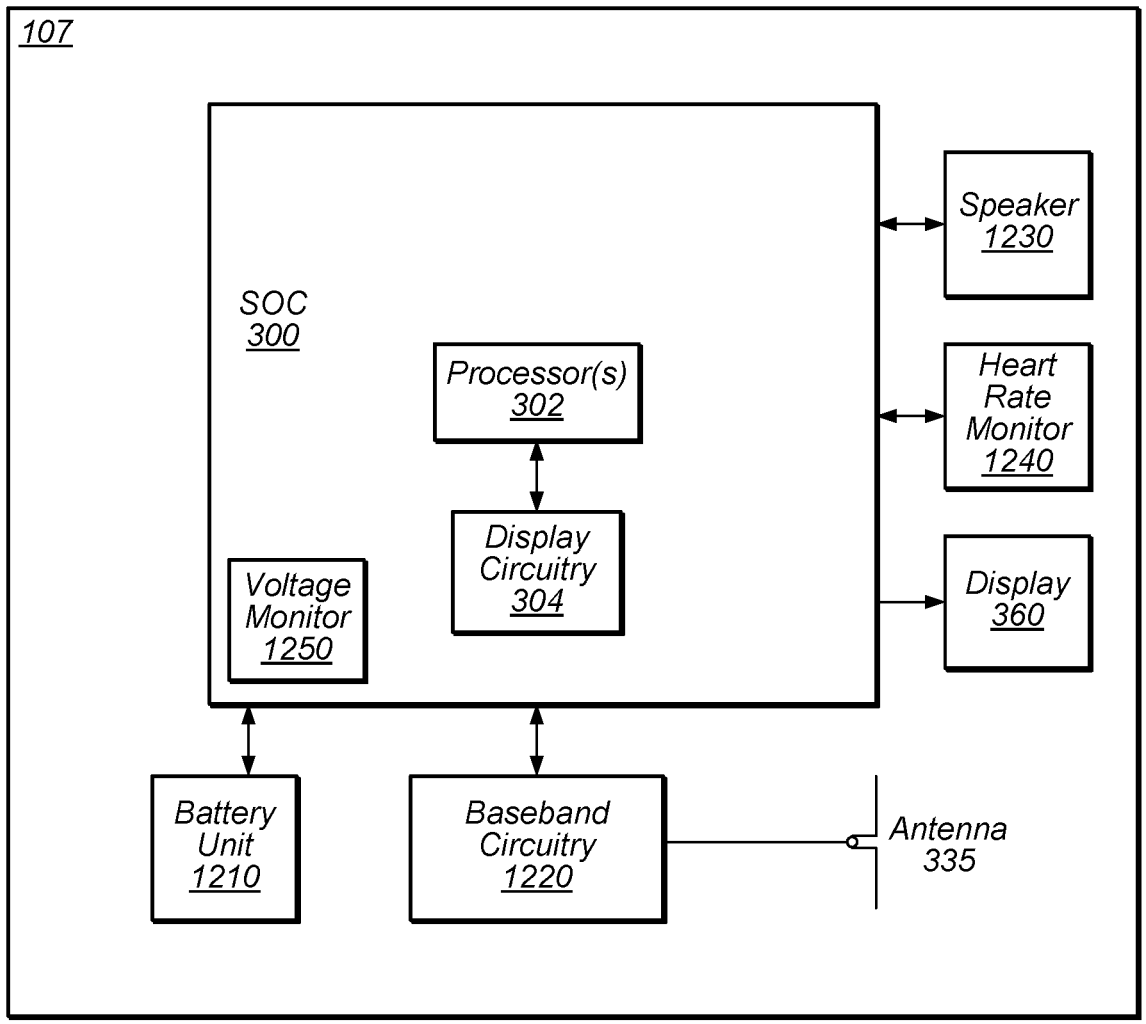
FIG. 12 is a block diagram illustrating an accessory device that includes exemplary non-radio components, according to some embodiments.

FIG. 12—Example Simplified Accessory Device with Battery Unit

FIG. 12 is a simplified block diagram of accessory device 107, according to some embodiments. In the illustrated embodiment, accessory device 107 includes a battery unit 1210, baseband circuitry 1220, voltage monitor 1250, and exemplary non-radio components (speaker 1230, heart rate monitor 1240, and display 360 in the illustrated embodiment). Other elements of FIG. 12 may correspond to similarly numbered elements of FIG. 3, in some embodiments.

In some embodiments, battery unit 1210 includes one or more batteries configured to power device 107. In some embodiments, battery unit 1210 is configured to provide battery output voltage level information to various elements of device 107. In some embodiments, the illustrated voltage monitor 1250 includes circuitry configured to determine voltage level information for the battery unit 1210. The one or more batteries are rechargeable in some embodiments.

In some embodiments, battery unit 1210 is able to support multiple components of device 107 in full operational mode for only a short period of time, especially when RF transmission is performed at peak transmission power. In some operational situations, the battery output voltage may drop below a threshold voltage for short periods. If this happens frequently, the one or more batteries may burn out and no longer function correctly. Therefore, reduction in the frequency of occurrence of such low-voltage intervals while maintaining functionality of device 107 (e.g., not dropping voice calls) may be desired.

Two techniques for dealing with limited RF capabilities in device 107 include reducing VoLTE payload size and increasing the number of transmissions for each VoLTE payload (e.g., using TTI-B (transmission time interval bundling) and/or increasing the number of times TTI bundles are transmitted).

As discussed above, there may be three general methods for reducing VoLTE payload size. A first method involves reducing the audio codec rate. A second method involves audio bundle splitting (e.g., as discussed with reference to FIG. 6). A third method involves using RLC segmentation.

Also, increasing the number of transmissions for each VoLTE payload may increase the energy per bit and increase communication performance. In some embodiments, the number of transmissions for a given HARQ process is limited. For example, if the VoLTE transmission period is 20 ms, there may be a maximum of two TTI bundles for a given HARQ process; if the VoLTE transmission period is 40 ms, there may be a maximum of three TTI bundles for a given HARQ process; and if the VoLTE transmission period is 60 ms, there may be a maximum of four TTI bundles for a given HARQ process. Thus, to increase the maximum number of transmissions in a transmission period above these limits, multiple parallel HARQ processes may be needed. Further, under typical operating conditions, the number of HARQ processes needed may be greater than indicated by the examples above, e.g., because the number of maximum transmissions that can actually be performed is typically smaller than the provided ideal values.

In some embodiments, if the number of parallel HARQ processes is insufficient, audio frames in the PDCP buffer may have to be discarded once a timer expires (e.g., after 100 ms in some embodiments) which may cause an increase in frame error rate. A frame error rate of 1% or less may be needed for good VoLTE call quality. Further, acceptable VoLTE call quality may require a mouth-to-ear total delay of less than 270 ms, which may be effected by the number of transmissions.

Increasing the number of parallel HARQ processes, however, may increase the average transmission duty cycle, which may draw more power from battery unit 1210 and cause the output voltage to dip below the acceptable voltage level.

Figure 13A:
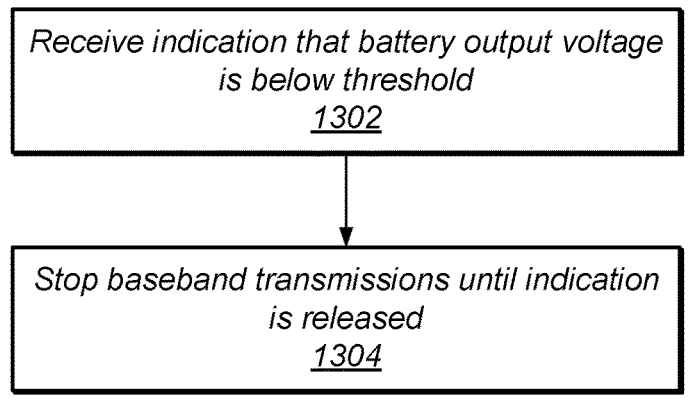
FIG. 13A is a flowchart diagram illustrating a method for stopping baseband transmissions based on battery output level, according to some embodiments.
Figure 13B:
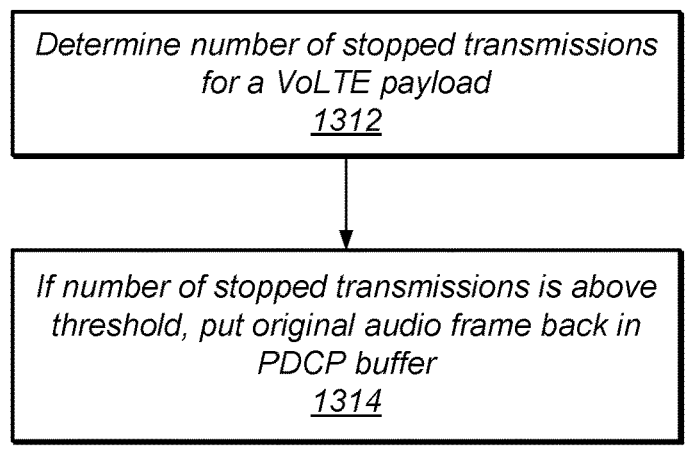
FIG. 13B is a flowchart diagram illustrating a method for re-scheduling stopped audio transmissions, according to some embodiments.

FIGS. 13A-13B—Exemplary Technique for TX Blanking Based on Battery Level

FIG. 13A is a flowchart diagram illustrating a method for stopping scheduled transmissions for audio frame transmission based on battery information. The method may be performed by an accessory device (such as accessory device 107) and/or a UE device (such as UE 106), e.g., using the systems and methods discussed above. More generally, the method shown in FIG. 13A may be used in conjunction with any of the systems or devices discussed herein, among other devices. In various embodiments, some of the method elements shown may be performed concurrently, in a different order than shown, or may be omitted. Note also that additional method elements may also be performed as desired. The method may be performed as follows.

At 1302, an indication is received that battery output voltage is below a threshold. In some embodiments, battery unit 1210 is configured to provide this indication to baseband circuitry 1220. The low battery output may be caused by cellular transmissions at high power while other elements of device 107 are operating in a full operational mode, for example, among other potential causes. Note that while VoLTE is discussed with reference to some embodiments, the disclosed techniques may be used in various embodiments with any appropriate packet-switched voice communications technology. VoLTE is discussed for illustrating purposes and is not intended to limit the scope of the present disclosure.

At 1304, device 107 stops baseband transmissions until the indication is released (e.g., until the battery level is above the threshold). In some embodiments, the transmissions may be stopped even though they have been scheduled (e.g., even though the network has provided grants for the transmissions). In some embodiments, different battery level thresholds may be used to stop and start baseband transmissions while in other embodiments the same threshold may be used. Because the battery-low condition may typically be short (e.g., 1 ms and rarely exceeding 5 ms), in embodiments in which HARQ and/or TTI-B are used, stopping the transmissions may not prevent successful transmission of an audio frame (e.g., one or more TTI-B transmissions may already have been sent or may be sent after the blanking interval and may be decoded successfully by the network). In other situations, transmission of audio data may need to be rescheduled, e.g., as discussed below with reference to FIG. 13B.

In some embodiments, device 107 is configured to determine and store information indicating the frequency of this indication, which transmissions are blanked, the number of stopped transmissions for each VoLTE payload or audio frame, and the HARQ process(es) of blanked transmissions.

FIG. 13B is a flowchart diagram illustrating a method for re-scheduling transmission of audio frames based on stopped transmissions. The method may be performed by an accessory device (such as accessory device 107) and/or a UE device (such as UE 106), e.g., using the systems and methods discussed above. More generally, the method shown in FIG. 13B may be used in conjunction with any of the systems or devices discussed herein, among other devices. In various embodiments, some of the method elements shown may be performed concurrently, in a different order than shown, or may be omitted. Note also that additional method elements may also be performed as desired. The method may be performed as follows.

At 1312, device 107 determines the number of stopped transmissions for a VoLTE payload (e.g., as discussed with reference to 1304 above).

At 1314, if the number of stopped transmissions for the VoLTE payload is above a threshold value, the original audio frame is placed back in the PDCP buffer for eventual re-transmission. Device 107 may abort the current transmission of the VoLTE payload using the current HARQ process in conjunction with placing the payload back in the PDCP buffer. The frame may subsequently be re-transmitted from the PDCP buffer out of real-time protocol (RTP) order, but this may be resolved by the network, e.g., using an audio jitter buffer. In some embodiments, putting audio frames back in the buffer may eventually cause frames to be dropped, e.g., due to a timer expiration for the PDCP buffer. An exemplary timer interval is 100 ms.

In some embodiments, if the number of stopped transmissions for the VoLTE payload is less than the threshold value, the blanking is processed as a normal transmission failure (e.g., handled similarly to a failure to pass a cyclic redundancy check) rather than re-scheduling the audio frame.

In some embodiments, device 107 is configured to measure and store information indicating one or more of: average number of transmissions per VoLTE payload, block error rate (BLER), the number of audio frames pending in the PDCP buffer, and/or the discard rate from the PDCP buffer due to timer expiration(s).

Figure 14:
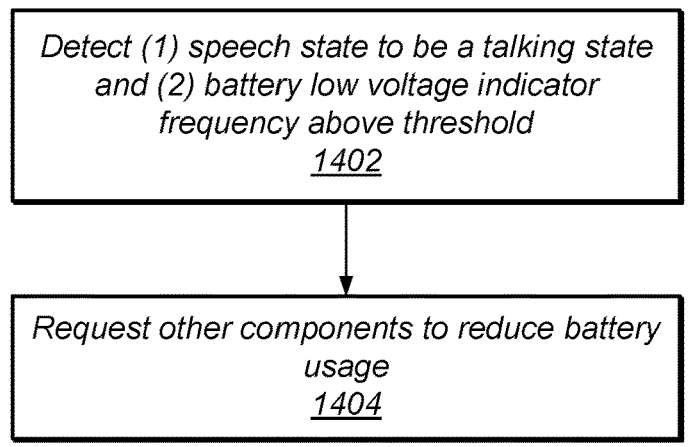
FIG. 14 is a flowchart diagram illustrating a method for requesting reductions in power consumption in a speech state, according to some embodiments.

FIG. 14—Exemplary Reduction of Battery Usage During Talking State

Normal speech patterns typically include roughly 40% talking, 20% silence, and 40% listening. Also, a normal burst of speech typically lasts from 500 ms to 2 seconds. In some embodiments, device 107 is configured to determine a speech mode, e.g., based on the contents of audio frames being transmitted. In some embodiments, device 107 is configured to perform one or more power reduction actions when in a talking state, e.g., based on battery output level.

FIG. 14 is a flowchart diagram illustrating a method for reducing battery usage during a talking state, according to some embodiments. The method may be performed by an accessory device (such as accessory device 107) and/or a UE device (such as UE 106), e.g., using the systems and methods discussed above. More generally, the method shown in FIG. 14 may be used in conjunction with any of the systems or devices discussed herein, among other devices. In various embodiments, some of the method elements shown may be performed concurrently, in a different order than shown, or may be omitted. Note also that additional method elements may also be performed as desired. The method may be performed as follows.

At 1402, device 107 (e.g., using baseband circuitry 1220) determines a current speech state to be a talking state. In some embodiments, baseband circuitry 1220 makes this determination by detecting whether one or more audio frames pending transmission are silence frames or real audio frames. In the illustrated embodiment, device 107 further determines that the battery low voltage indicator is occurring at a frequency that is above a threshold frequency, which may mean that running out of battery power and/or damage to the battery may be imminent.

At 1404, device 107 requests other components (e.g., other than cellular transmission components) to reduce battery usage. In some embodiments, baseband circuitry 1220 is configured to send a global request to components of device 107. In some embodiments, baseband circuitry 1220 is configured to send requests to individual components. In some embodiments, the components may be configured to decide whether to accede to the request based on current operating conditions. Non-limiting examples of reductions in battery usage include: reducing the volume of speaker 1230, reducing the measuring frequency of heart rate monitor 1240, reducing the brightness of display 360, altering a power mode of processor(s) 302, disabling other wireless communications (e.g., WiFi and/or Bluetooth communications), etc.

Figure 15:
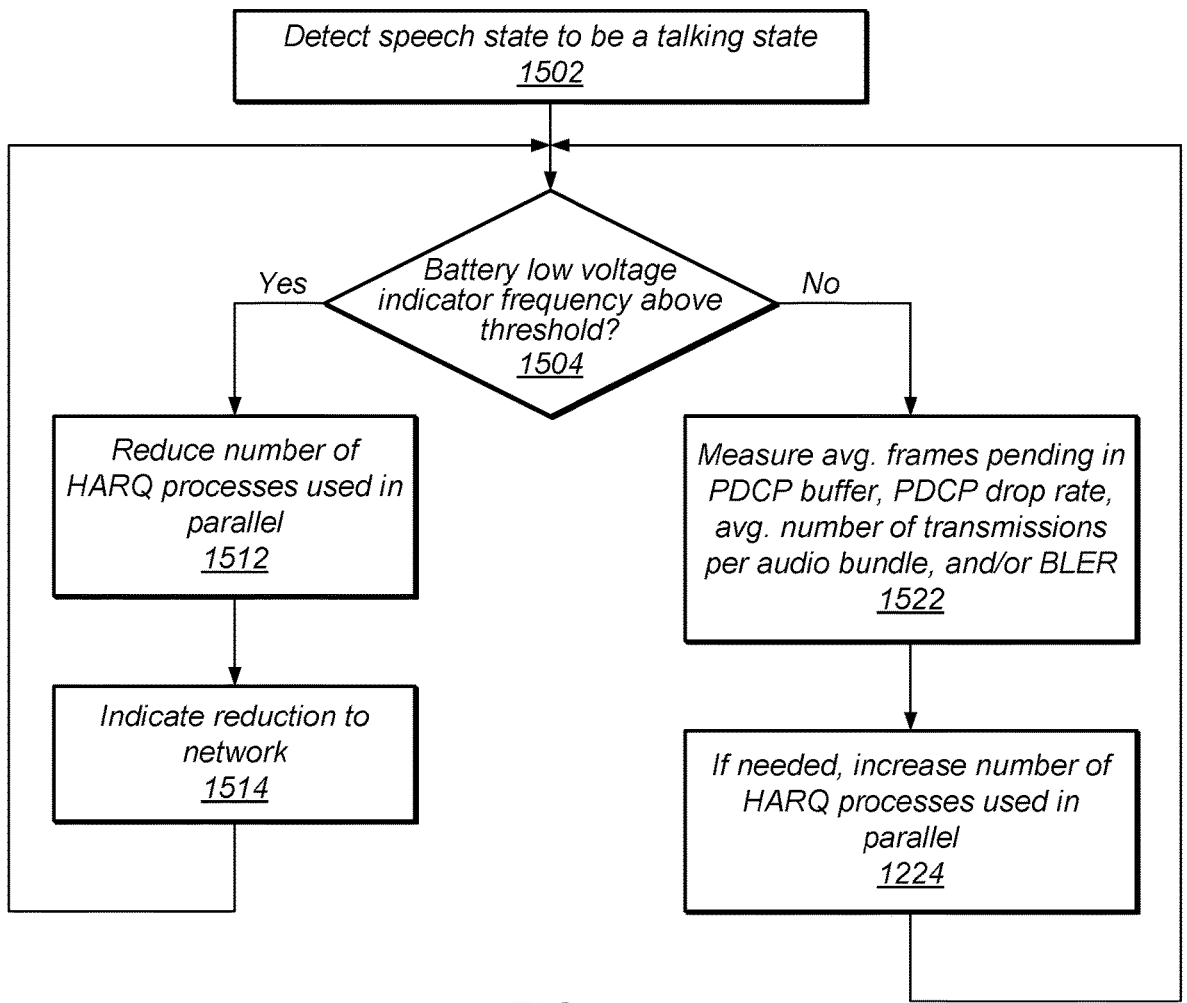
FIG. 15 is a flowchart diagram illustrating a method for dynamically managing HARQ processes based on battery output, according to some embodiments.

FIG. 15—Dynamic Adjustment of Parallel HARQ Processes

FIG. 15 is a flowchart diagram illustrating a method for dynamically adjusting the number of HARQ processes used in parallel. The method may be performed by an accessory device (such as accessory device 107) and/or a UE device (such as UE 106), e.g., using the systems and methods discussed above. More generally, the method shown in FIG. 15 may be used in conjunction with any of the systems or devices discussed herein, among other devices. In various embodiments, some of the method elements shown may be performed concurrently, in a different order than shown, or may be omitted. Note also that additional method elements may also be performed as desired. The method may be performed as follows.

At 1502, device 107 detects that a current speech state is a talking state. At 1504, device 107 determines whether the battery low voltage indicator frequency is above a threshold. The frequency may be averaged over a time interval of some pre-determined length. In some embodiments, the threshold is the same threshold as discussed above with reference to element 1402 of FIG. 14. If the frequency is above the threshold, flow proceeds to 1512.

At 1512, device 107 reduces the number of HARQ processes used in parallel. For example, baseband circuitry 1220 may reduce the number of HARQ processes from 4 to 3, from 4 to 2, from 3 to 2, etc. In some embodiments, reducing the number of HARQ processes by one may reduce TX power consumption by approximately 25%. Baseband circuitry 1220 may determine the HARQ process(es) to stop based on RTP sequence number (e.g., stopping the HARQ process with the largest RTP number may prevent the most-recently-scheduled transmission but allow older transmissions to proceed). Baseband circuitry 1220 may place the audio frame associated with the stopped HARQ process back in the PDCP buffer based on its RTP sequence number. When a HARQ sequence is stopped by device 107, it may not send any transmissions even though the network may have assigned an UL grant to the process, e.g., with a re-transmission grant. In some embodiments, if the HARQ process is being used to transmit one RLC segment of an audio bundle, baseband circuitry 1220 is configured to also stop the HARQ process being used to transmit the other RLC segment of the same audio bundle.

At 1514, device 107 indicates the reduction in the number of HARQ processes to the network. This may prevent the network from providing a greater number of grants than the current number of HARQ processes can utilize. To maintain the number of HARQ processes being used, device 107 may send a buffer status report (BSR) that includes the total number of bytes corresponding to audio frames that are enough to keep the new number of HARQ processes busy. This size may vary in different situations and embodiments. The following non-limiting examples are provided for situations in which C-DRX is configured to use 40 ms periods. In other situations, similar techniques may be used to determine BSR information, as appropriate.

In some embodiments, the following techniques are used when two HARQ processes are used in parallel. If the grant from the network is for 176 bits, the BSR is generated to have a size of two audio frames and RLC segmentation is used so that the two-audio-frame bundle with a size of 328 bits becomes two segments, each of 176 bits. If the grant from the network is 208 bits, the BSR is generated to have a size of two audio frames and audio-splitting is used (e.g., as described above with reference to FIGS. 5-6) and the two-audio-frame bundle of size 328 bits becomes two audio frames, each with 208 bits. If the grant from the network is 328 bits, the BSR is generated to have a size of four audio frames with two two-audio-frame bundles, where each bundle has a size of 328 bits and uses one HARQ process.

In some embodiments, the following techniques are used when three HARQ processes are used in parallel. If the grant from the network is 328 bits, the BSR is generated to have a size of three two-audio-frame bundles, where each bundle size is 328 bits and each two-audio-frame bundle uses one HARQ process. If the grant from the network is 176 bits for RLC segments or 208 bits for audio split, the BSR is generated to have a size of three segments.

In some embodiments, the following techniques are used when four HARQ processes are used in parallel. If the grant from the network is 328 bits, the BSR is generated to have a size of four two-audio-frame bundles, each having 328 bits and using one HARQ process. If the grant is 176 bits for RLC segments or 208 bits for audio split, the BSR is generated to have a size of four segments, or two two-audio-frame bundles, such that each segment uses one HARQ process.

As shown, if the reduction in HARQ processes does not cause the battery low voltage indicator frequency to fall below the threshold, blocks 1512 and 1514 may be performed one or more additional times (further reducing the number of HARQ processes) until the frequency is below the threshold.

In some embodiments, based on the number of HARQ processes being used, the number of frames pending in the PDCP buffer, the PDCP drop rate, the BLER, and/or the number of transmissions per audio bundle, baseband circuitry 1220 may be configured to drop the VoLTE call, e.g., if it determines that acceptable call quality can only be maintained (e.g., 1% frame error rate or less) by keeping the battery low voltage indicator frequency above the threshold.

If the battery low voltage indicator frequency is below the threshold at 1504, flow proceeds to 1522. At 1522, device 107 measures the average frames pending in the PDCP buffer, the PDCP drop rate, the average number of transmissions per audio bundle, and/or the BLER.

At 1524, based on the information determined at 1522, if additional HARQ processes are needed to maintain call quality, then the number of HARQ processes used in parallel is increased. In some embodiments, device 107 is configured to indicate the increase to the network, e.g., as described above with reference to 1514, but for an increase instead of a reduction. This may ensure that the network provides grants to utilize the increased number of HARQ processes.

In some embodiments, repeated performance of the two different branches from 1504 may create a closed control loop in which the number of HARQ processes is increased or reduced to create a stable system with efficient battery power usage, in most operating conditions.

Figure 16:
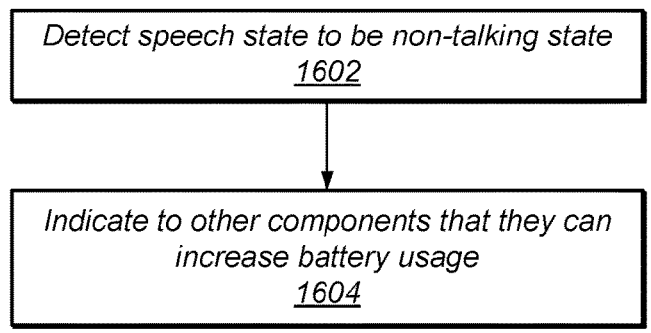
FIG. 16 is a flowchart diagram illustrating a method for increasing power to other components in non-talking speech states.

FIG. 16—Non-Talking States

FIG. 16 is a flowchart diagram illustrating a method for operating in non-talking speech states (e.g., listening and silence states), according to some embodiments. The method may be performed by an accessory device (such as accessory device 107) and/or a UE device (such as UE 106), e.g., using the systems and methods discussed above. More generally, the method shown in FIG. 16 may be used in conjunction with any of the systems or devices discussed herein, among other devices. In various embodiments, some of the method elements shown may be performed concurrently, in a different order than shown, or may be omitted. Note also that additional method elements may also be performed as desired. The method may be performed as follows.

At 1602, device 107 detects that the device is in a non-talking state. Baseband circuitry 1220 may detect a non-talking state based on the contents of scheduled audio frames and/or the lack of audio frames, in some embodiments.

At 1604, baseband circuitry 1220 indicates to other components that they can increase battery usage. In some embodiments, baseband circuitry 1220 is configured to send a global indication to components of device 107. In some embodiments, baseband circuitry 1220 is configured to send indications to individual components. Non-limiting examples of increases in battery usage include: increasing the volume of speaker 1230, increasing the measuring frequency of heart rate monitor 1240, increasing the brightness of display 360, altering a power mode of processor(s) 302, enabling other wireless communications (e.g., Bluetooth communications), etc.

In some embodiments, two or more of the methods of FIGS. 13-16 and/or portions thereof may be used in combination to maintain a stable system in which call quality is efficiently maintained without battery damage.

Various Embodiments

The following paragraphs describe exemplary embodiments of the present disclosure.

One set of embodiments may include a mobile device, comprising: at least one antenna for performing wireless communication; a first radio coupled to the at least one antenna, wherein the first radio is configured to perform cellular communication with a base station; one or more processors coupled to the first radio, wherein the one or more processors and the first radio are configured to perform wireless communications using the at least one antenna; wherein the mobile device is configured to: communicate with a base station, wherein the communication comprises a real-time IP session, wherein at a first time during the real-time IP session, communication between the mobile device and the base station may have a first performance metric and the mobile device may implement a first frame transmission scheme; determine a current performance metric for communication of the real-time IP session; and based on the current performance metric, modify the first frame transmission scheme of the real-time IP session.

According to some embodiments, the first performance metric and the current performance metric comprise one or more of block error rate (BLER) or received signal strength indication (RSSI).

According to some embodiments, the first frame transmission scheme comprises using a first audio codec rate, wherein the second transmission scheme comprises using a second audio codec rate lower than the first audio codec rate.

According to some embodiments, the first frame transmission scheme comprises using a first number of retransmissions, wherein the second transmission scheme comprises using a second number of retransmissions higher than the first number of retransmissions.

According to some embodiments, the first frame transmission scheme comprises using a first number of HARQ processes, wherein the second transmission scheme comprises using a second number of HARQ processes higher than the first number of HARQ processes.

According to some embodiments, the first frame transmission scheme comprises bundling a first number of frames, wherein the second transmission scheme comprises bundling a second number of frames different than the first number of frames.

According to some embodiments, the first frame transmission scheme comprises using a first MAC PDU size, wherein the second transmission scheme comprises using a second MAC PDU size different than the first MAC PDU size.

According to some embodiments, said determining and said modifying is performed a plurality of times throughout the IP session.

According to some embodiments, the IP session comprises a VoLTE session.

According to some embodiments, the mobile device is a smart watch.

According to some embodiments, the mobile device is an accessory device, wherein the mobile device further comprises: a second radio coupled to the at least one antenna, wherein the second radio is configured to perform short range communication with a companion device.

One set of embodiments may include a mobile device, comprising: at least one antenna for performing wireless communication; a first radio coupled to the at least one antenna, wherein the first radio is configured to perform cellular communication with a base station; one or more processors coupled to the first radio, wherein the one or more processors and the first radio are configured to perform wireless communications using the at least one antenna; wherein the mobile device is configured to: communicate with a base station, wherein the communication comprises a voice over IP (VoIP) session; determine an uplink grant size for the VoIP session; compare the uplink grant size to an audio bundle size of an audio configuration used for the VoIP session; in response to the uplink grant size being less than the audio bundle size, modify the audio configuration to reduce the audio bundle size to less than or equal to the uplink grant size.

According to some embodiments, modifying the audio configuration comprises reducing the number of audio frames per audio bundle.

According to some embodiments, reducing the number of audio frames per audio bundle comprises reducing the number of audio frames per audio bundle to one.

According to some embodiments, modifying the audio configuration comprises reducing an audio codec rate.

One set of embodiments may include an accessory device, comprising: at least one antenna for performing wireless communication; a first radio coupled to the at least one antenna, wherein the first radio is configured to perform cellular communication with a base station; a second radio coupled to the at least one antenna, wherein the second radio is configured to perform short range communication with a companion device; one or more processors coupled to the first and second radios, wherein the one or more processors and the first and second radios are configured to perform wireless communications using the at least one antenna; wherein the accessory device is configured to: perform an IP session with a base station, wherein at a first time, communication between the accessory device and the base station may have a first performance metric and the accessory device may implement a first frame transmission scheme; determine a current performance metric; based on the current performance metric, modify the first frame transmission scheme.

According to some embodiments, the first performance metric and the current performance metric comprise one or more of block error rate (BLER) or received signal strength indication (RSSI).

According to some embodiments, the first frame transmission scheme comprises using a first audio codec rate, wherein the second transmission scheme comprises using a second audio codec rate lower than the first audio codec rate.

According to some embodiments, the first frame transmission scheme comprises using a first number of retransmissions, wherein the second transmission scheme comprises using a second number of retransmissions higher than the first number of retransmissions.

According to some embodiments, the first frame transmission scheme comprises using a first number of HARQ processes, wherein the second transmission scheme comprises using a second number of HARQ processes higher than the first number of HARQ processes.

According to some embodiments, the first frame transmission scheme comprises bundling a first number of frames, wherein the second transmission scheme comprises bundling a second number of frames different than the first number of frames.

According to some embodiments, the first frame transmission scheme comprises using a first MAC PDU size, wherein the second transmission scheme comprises using a second MAC PDU size different than the first MAC PDU size.

According to some embodiments, said determining and said modifying is performed a plurality of times throughout the IP session.

One set of embodiments may include a mobile device, comprising: at least one antenna for performing wireless communication, a first radio coupled to the at least one antenna, wherein the first radio is configured to perform cellular communication with a base station, and one or more processors coupled to the first radio, wherein the one or more processors and the first radio are configured to perform wireless communications using the at least one antenna.

According to some embodiments, the mobile device is configured to communicate with a base station, wherein the communication comprises a real-time IP session, wherein at a first time during the real-time IP session, communication between the mobile device and the base station may have a first performance metric and the mobile device may implement a first frame transmission scheme. According to some embodiments, the mobile device is configured to determine a current performance metric for communication of the real-time IP session and, based on the current performance metric, modify the first frame transmission scheme of the real-time IP session.

According to some embodiments, the first performance metric and the current performance metric comprise one or more of a block error rate (BLER) or received signal strength indication (RSSI).

According to some embodiments, the first frame transmission scheme comprises using a first audio codec rate, and wherein the second transmission scheme comprises using a second audio codec rate lower than the first audio codec rate.

According to some embodiments, the first frame transmission scheme comprises using a first number of retransmissions, and wherein the second transmission scheme comprises using a second number of retransmissions higher than the first number of retransmissions.

According to some embodiments, the first frame transmission scheme comprises using a first number of HARQ processes, and wherein the second transmission scheme comprises using a second number of HARQ processes higher than the first number of HARQ processes.

According to some embodiments, the first frame transmission scheme comprises bundling a first number of frames, and wherein the second transmission scheme comprises bundling a second number of frames different than the first number of frames.

According to some embodiments, the first frame transmission scheme comprises using a first MAC PDU size, and wherein the second transmission scheme comprises using a second MAC PDU size different than the first MAC PDU size.

According to some embodiments, said determining and said modifying is performed a plurality of times throughout the IP session.

According to some embodiments, the real time IP session comprises a VoLTE session.

According to some embodiments, the mobile device is an accessory device, wherein the mobile device further comprises: a second radio coupled to the at least one antenna, wherein the second radio is configured to perform short range communication with a companion device.

One set of embodiments may include a mobile device, comprising: at least one antenna for performing wireless communication, a first radio coupled to the at least one antenna, wherein the first radio is configured to perform cellular communication with a base station, and one or more processors coupled to the first radio, wherein the one or more processors and the first radio are configured to perform wireless communications using the at least one antenna.

According to some embodiments, the mobile device is configured to: communicate with a base station, wherein the communication comprises a voice over IP (VoIP) session, determine an uplink grant size for the VoIP session, compare the uplink grant size to an audio bundle size of an audio configuration used for the VoIP session, and, in response to the uplink grant size being less than the audio bundle size, modify the audio configuration to reduce the audio bundle size to less than or equal to the uplink grant size.

According to some embodiments, modifying the audio configuration comprises reducing the number of audio frames per audio bundle.

According to some embodiments, reducing the number of audio frames per audio bundle comprises reducing the number of audio frames per audio bundle to one.

According to some embodiments, modifying the audio configuration comprises reducing an audio codec rate.

In one set of embodiments, a mobile device may be configured to: in response to detecting that a voltage corresponding to battery output is below a particular threshold, preventing an upcoming scheduled wireless transmission until the voltage returns to above the particular threshold.

According to some embodiments, the upcoming scheduled transmission is one of multiple transmissions for an audio frame based on HARQ and TTI-B transmission of the audio frame.

According to some embodiments, the mobile device is further configured to: determine and store information indicating the audio frame and a HARQ process corresponding to the upcoming scheduled transmission.

According to some embodiments, the mobile device is configured to, in response to determining that a number of stopped upcoming scheduled transmissions for the audio frame exceeds a threshold number of transmissions, put the audio frame back into a Packet Data Convergence Protocol (PDCP) buffer from which the audio frame was retrieved for transmission.

According to some embodiments, the mobile device is further configured to determine and store at least one of: an average number of transmissions for each of a plurality of audio frames over a time interval, a number of audio frames pending in a PDCP buffer, a number of audio frames discarded from the PDCP buffer, or a block error rate (BLER) for the plurality of audio frames.

According to some embodiments, the audio frame is a voice over LTE (VoLTE) frame.

According to some embodiments, the mobile device is configured to stop all cellular transmissions from the mobile device until the voltage corresponding to the battery output is above a threshold value.

According to some embodiments, the mobile device is configured to determine: the length of a time interval during which the voltage corresponding to the battery output is below the particular threshold and the frequency at which the voltage corresponding to the battery output drops below the particular threshold.

In one set of embodiments, a mobile device may be configured to: determine that the mobile device is in a talking state, determine that a voltage corresponding to battery output is dropping below a threshold value at greater than a threshold frequency, and perform a power reduction action in response to the determination that the mobile device is in a talking state and that the voltage is dropping below a threshold value at greater than the threshold frequency.

According to some embodiments, the power reduction action includes reducing power consumption by one or more non-radio components of the mobile device.

According to some embodiments, to reduce power consumption by other components of the mobile device, the mobile device is configured to perform one or more of: reduce a heart rate monitor measuring frequency, reduce a screen brightness, reduce an audio volume, alter a processor power mode, or disable short-range wireless transmissions.

According to some embodiments, the power reduction action includes reducing a number of HARQ processes used in parallel by the mobile device to generate transmissions for audio frames.

According to some embodiments, the mobile device is configured to select a HARQ process to stop when reducing the number of HARQ processes based on a real-time protocol (RTP) sequence number of a packet being processed by the HARQ process.

According to some embodiments, the mobile device is configured to stop multiple HARQ processes that are being used to process different radio link control (RLC) segments of the same audio payload.

According to some embodiments, the mobile device is configured to increase a number of HARQ processes used in parallel by the mobile device to generate transmission for audio frames in response to determining that the voltage corresponding to battery output is dropping below a threshold value at a frequency that is lower than the threshold frequency.

According to some embodiments, the mobile device is configured to transmit a buffer status report (BSR) that indicates a number of HARQ processes used in parallel by the mobile device after the power reduction action.

According to some embodiments, the mobile device is configured to drop a call in response to at least one of the following conditions after reducing the number of HARQ processes: a frame error rate above a particular threshold, or an audio frame drop rate for a Packet Data Convergence Protocol (PDCP) buffer above a particular threshold.

According to some embodiments, the mobile device is configured to determine that it is in a talking state based on the contents of audio frames being processed by the mobile device.

According to some embodiments, the mobile device is configured to, in response to determining that the mobile device is not in a talking state, increase power provided to one or more non-radio components of the mobile device.

One set of embodiments may include a method corresponding to the mobile device discussed above.

One set of embodiments may include a non-transitory computer accessible memory medium storing program instructions corresponding to the accessory device discussed above.

One set of embodiments may include a computer program comprising instructions corresponding to the accessory device discussed above.

One set of embodiments may include an apparatus comprising means for performing methods corresponding to the accessory device discussed above.

One set of embodiments may include a method that includes any action or combination of actions as substantially described herein in the Detailed Description.

One set of embodiments may include a method as substantially described herein with reference to each or any combination of the Figures or with reference to each or any combination of paragraphs in the Detailed Description.

One set of embodiments may include a wireless device configured to perform any action or combination of actions as substantially described herein in the Detailed Description.

One set of embodiments may include a wireless device that includes any component or combination of components as described herein in the Detailed Description as included in a wireless device.

One set of embodiments may include a non-volatile computer-readable medium that stores instructions that, when executed, cause the performance of any action or combination of actions as substantially described herein in the Detailed Description.

One set of embodiments may include an integrated circuit configured to perform any action or combination of actions as substantially described herein in the Detailed Description.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or accessory device 107) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   one or more processing elements; and
   one or more memories having program instructions stored thereon that are executable by the one or more processing elements to:
   wirelessly communicate with a base station for a cell, wherein the communication includes a voice or video session, wherein at a first time during the voice or video session, communication between the apparatus and the base station uses a first retransmission parameter for an uplink communication;
   detect a weak cell condition associated with the cell; and
   based on the weak cell condition, communicate with the base station to use a second retransmission parameter for uplink communications for the voice or video session, wherein the second retransmission parameter extends uplink delay budget relative to the first retransmission parameter.

2. The apparatus of claim 1, wherein the second retransmission parameter includes enabling transmission time interval (TTI) bundling, wherein TTI bundling uses a number of retransmissions associated with a HARQ process within a TTI bundle size, wherein the first retransmission parameter does not enable TTI-bundling.

3. The apparatus of claim 1, wherein the second retransmission parameter has a reduced codec rate relative to the first retransmission parameter.

4. The apparatus of claim 1, wherein the first retransmission parameter specifies using a first number of repetitions and wherein the second retransmission parameter specifies using a second number of repetitions that is greater than the first number of repetitions.

5. The apparatus of claim 1, wherein the communication with the base station includes indicating the weak cell condition to the base station.

6. The apparatus of claim 1, wherein the weak cell condition corresponds to quality of the voice or video session.

7. The apparatus of claim 1, wherein the weak cell condition corresponds to radio conditions associated with cell coverage.

8. The apparatus of claim 1, wherein the apparatus is a mobile device that further comprises:
   one or more radios; and
   one or more antennas.

9. A non-transitory computer-readable medium having instructions stored thereon that are executable by a mobile computing device to perform operations comprising:
   wirelessly communicating with a base station for a cell, wherein the communication includes a voice or video session, wherein at a first time during the voice or video session, communication between the computing device and the base station uses a first retransmission parameter for an uplink communication;
   detecting a weak cell condition associated with the cell; and
   based on the weak cell condition, communicating with the base station to use a second retransmission parameter for uplink communications for the voice or video session, wherein the second retransmission parameter extends uplink delay budget relative to the first retransmission parameter.

10. The non-transitory computer-readable medium of claim 9, wherein the second retransmission parameter includes enabling transmission time interval (TTI) bundling, wherein TTI bundling uses a number of retransmissions associated with a HARQ process within a TTI bundle size, wherein the first retransmission parameter does not enable TTI-bundling.

11. The non-transitory computer-readable medium of claim 9, wherein the first retransmission parameter specifies using a first number of repetitions and wherein the second retransmission parameter specifies using a second number of repetitions that is greater than the first number of repetitions.

12. The non-transitory computer-readable medium of claim 9,
   wherein the communication with the base station includes indicating the weak cell condition to the base station.

13. The non-transitory computer-readable medium of claim 9, wherein the weak cell condition corresponds to one or more of:
   quality of the voice or video session; or
   radio conditions associated with cell coverage.

14. A method, comprising:
   wirelessly communicating, by a base station for a cell, with a mobile device, wherein the communication includes a voice or video session, wherein at a first time during the voice or video session, the communicating uses a first retransmission parameter for an uplink communication; and
   wirelessly communicating, by the base station with the mobile device, to use a second retransmission parameter for uplink communications for the voice or video session, wherein the second retransmission parameter extends uplink delay budget relative to the first retransmission parameter, wherein the use of the second retransmission parameter is based on detection of a weak cell condition associated with the cell.

15. The method of claim 14, wherein the second retransmission parameter includes enabling transmission time interval (TTI) bundling, wherein TTI bundling uses a number of retransmissions associated with a HARQ process within a TTI bundle size, wherein the first retransmission parameter does not enable TTI-bundling.

16. The method of claim 14, wherein the second retransmission parameter has a reduced codec rate relative to the first retransmission parameter.

17. The method of claim 16, wherein the weak cell condition corresponds to one or more of:
   quality of the voice or video session; or
   radio conditions associated with cell coverage.

18. The method of claim 14, wherein the first retransmission parameter specifies using a first number of repetitions and wherein the second retransmission parameter specifies using a second number of repetitions that is greater than the first number of repetitions.

19. The method of claim 14,
   wherein the wirelessly communicating includes receiving information from the mobile device that indicates the weak cell condition.

20. The method of claim 14, wherein the voice or video session includes voice over long term evolution (VoLTE) communication.

\* \* \* \* \*